(12) United States Patent
Mohan et al.

(10) Patent No.: US 7,530,050 B2
(45) Date of Patent: May 5, 2009

(54) METHOD AND SYSTEM FOR DEVELOPING SOFTWARE USING NODES

(75) Inventors: Ram P. Mohan, Cupertino, CA (US); Shariq Mansoor, Cupertino, CA (US)

(73) Assignee: FusionOps, Sunnyvale, CA (US)

( * ) Notice: Subject to any disclaimer, the term of this patent is extended or adjusted under 35 U.S.C. 154(b) by 762 days.

(21) Appl. No.: 10/815,545

(22) Filed: Mar. 31, 2004

(65) Prior Publication Data

US 2005/0005262 A1 Jan. 6, 2005

(51) Int. Cl.
*G06F 9/44* (2006.01)
(52) U.S. Cl. .................................... 717/100; 717/105
(58) Field of Classification Search ................ 717/103, 717/105, 107, 108, 116, 127, 106, 100; 709/220; 705/8.9, 8, 9; 715/506, 511, 762, 967, 969, 715/970, 963
See application file for complete search history.

(56) References Cited

U.S. PATENT DOCUMENTS

| | | | |
|---|---|---|---|
| 4,315,315 A * | 2/1982 | Kossiakoff | 717/109 |
| 5,241,645 A | 8/1993 | Cimral et al. | |
| 5,276,884 A | 1/1994 | Mohan et al. | |
| 5,479,643 A * | 12/1995 | Bhaskar et al. | 717/124 |
| 5,479,646 A * | 12/1995 | Proebsting | 711/167 |
| 5,485,569 A * | 1/1996 | Goldman et al. | 715/202 |
| 5,495,567 A | 2/1996 | Iizawa et al. | |
| 5,724,556 A | 3/1998 | Souder et al. | |
| 5,745,687 A | 4/1998 | Randell | |
| 5,761,508 A * | 6/1998 | Okuno | 717/100 |
| 5,790,789 A | 8/1998 | Suarez | |
| 5,878,407 A | 3/1999 | Olgac | |
| 5,991,535 A * | 11/1999 | Fowlow et al. | 717/107 |
| 6,000,000 A * | 12/1999 | Hawkins et al. | 707/201 |
| 6,018,627 A * | 1/2000 | Iyengar et al. | 717/103 |
| 6,023,580 A * | 2/2000 | Sifter | 717/124 |
| 6,163,317 A | 12/2000 | de Judicibus | |
| 6,189,138 B1 * | 2/2001 | Fowlow et al. | 717/107 |
| 6,199,197 B1 * | 3/2001 | Engstrom et al. | 717/100 |
| 6,205,575 B1 * | 3/2001 | Sherman et al. | 717/100 |
| 6,223,345 B1 | 4/2001 | Jones et al. | |
| 6,266,805 B1 | 7/2001 | Nwana et al. | |
| 6,275,979 B1 * | 8/2001 | Graser et al. | 717/100 |
| 6,308,163 B1 | 10/2001 | Du et al. | |
| 6,314,555 B1 | 11/2001 | Ndumu et al. | |
| 6,336,217 B1 * | 1/2002 | D'Anjou et al. | 717/121 |
| 6,425,121 B1 * | 7/2002 | Phillips | 717/109 |

(Continued)

OTHER PUBLICATIONS

Softwire Graphical Programming for Visual Basic, 2000, SoftWIRE version 2.0, pp. 1-40.*

(Continued)

*Primary Examiner*—Wei Y Zhen
*Assistant Examiner*—Anna Deng
(74) *Attorney, Agent, or Firm*—Amin, Turocy & Calvin, LLP

(57) ABSTRACT

A method for creating software provides a plurality of nodes and a directory of applications. Each application is created by use of at least a portion of the plurality of the nodes. At least a portion of the plurality of nodes are selected to create a selected node layout that represent a plurality of application logics. The selected node layout is executed by a server program.

32 Claims, 42 Drawing Sheets

Sample Business Process

U.S. PATENT DOCUMENTS

| | | | |
|---|---|---|---|
| 6,437,805 B1 * | 8/2002 | Sojoodi et al. | 715/763 |
| 6,505,343 B1 * | 1/2003 | Menon et al. | 717/116 |
| 6,519,601 B1 | 2/2003 | Bosch | |
| 6,553,361 B1 | 4/2003 | Compton et al. | |
| 6,564,368 B1 * | 5/2003 | Beckett et al. | 717/113 |
| 6,601,233 B1 * | 7/2003 | Underwood | 717/102 |
| 6,601,234 B1 * | 7/2003 | Bowman-Amuah | 717/108 |
| 6,684,385 B1 * | 1/2004 | Bailey et al. | 717/109 |
| 6,701,513 B1 * | 3/2004 | Bailey | 717/109 |
| 6,745,382 B1 * | 6/2004 | Zothner | 717/107 |
| 6,789,252 B1 * | 9/2004 | Burke et al. | 717/100 |
| 6,810,401 B1 * | 10/2004 | Thompson et al. | 707/101 |
| 6,862,573 B2 * | 3/2005 | Kendall et al. | 705/7 |
| 6,963,847 B1 * | 11/2005 | Kennedy et al. | 705/8 |
| 7,082,599 B1 * | 7/2006 | Morganelli et al. | 717/132 |
| 7,103,605 B1 * | 9/2006 | Hazi et al. | 707/102 |
| 7,249,044 B2 * | 7/2007 | Kumar et al. | 705/8 |
| 2001/0052112 A1 | 12/2001 | Mohan et al. | |
| 2002/0123984 A1 | 9/2002 | Prakash | |
| 2003/0004836 A1 | 1/2003 | Otter et al. | |
| 2003/0110472 A1 | 6/2003 | Alloing et al. | |
| 2004/0205630 A1 | 10/2004 | Parks et al. | |
| 2005/0005262 A1 | 1/2005 | Mohan et al. | |
| 2005/0065936 A1 | 3/2005 | Goering | |

OTHER PUBLICATIONS

Visual Basic Unleashed, Robert Thayer, Sep. 11, 1998, pp. 7-74, 213-255, 269-278, 427-556, 606-612, 689-736, 781-791, 890-913.*

Visual Object-Oriented Programming Concepts and Environments, Margaret M. Burnett et al, 1995, Whole Book.*

Template Software, Workflow Template Process Template Developing a WFT Workflow System, Chapters 1-4 and 8-9 and index.*

Griss, et al. "Building Object-Oriented Instruments Kits", HPL-96-22, 1996, pp. 1-17.

Herbst. "Business Rule in Systems Analysis: A Meta Model and Repository System" Information Systems, vol. 21, No. 2, 1966, pp. 147-166.

Shan, et al. "HP Workflow Research: Past, Present and Future", HPL-97-105, pp. 1-15.

OA Dated Oct. 2, 2008 for U.S. Appl. No. 11/530,115, 34 pages.

* cited by examiner

Sample Business Process

Node Example Details - Links and User Interface Specifications

Reusable Process Definitions

Node Conditional Logic

Sample Application Screen Shots

 The process node represents a complete process and contains global variables for the process

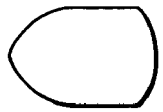 The display node represents the logic to display titles, screen descriptions and display objects such as radio buttons, pull-down menus, checkboxes etc. The individual display objects may have a wide range of animated behaviors and may accept input that is stored in global variables.

 The purchase node represents the placing of a certain number of specific items for purchase on a shopping cart paradigm for later checkout. e.g., place a 4X CD-ROM, associated documentation and a software driver in the shopping cart

 The interface node represents the interaction with external applications using a pre-defined interface known as an API (application programming interface) e.g., issue a call to a relational database requesting records that match a certain criteria

 The computation node represents the computation of a variable using a formula e.g., $A = B*3 + 4*D**2/5.4$

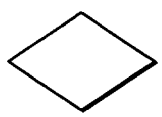 Links represent the conditions under which a subsequent node will be executed e.g., $A< 5$ AND $B >C$ Node Types and Links

FIG. 7

Display Node

Display Components

Templates provide a means to define an overall look & feel for a specific screen display
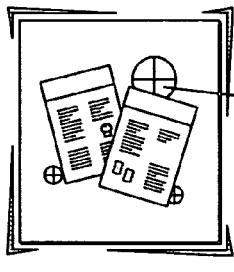
Templates may be associated with a website (lowest priority) or a specific process or with a specific display node (highest priority)
The highest priority template is the one selected
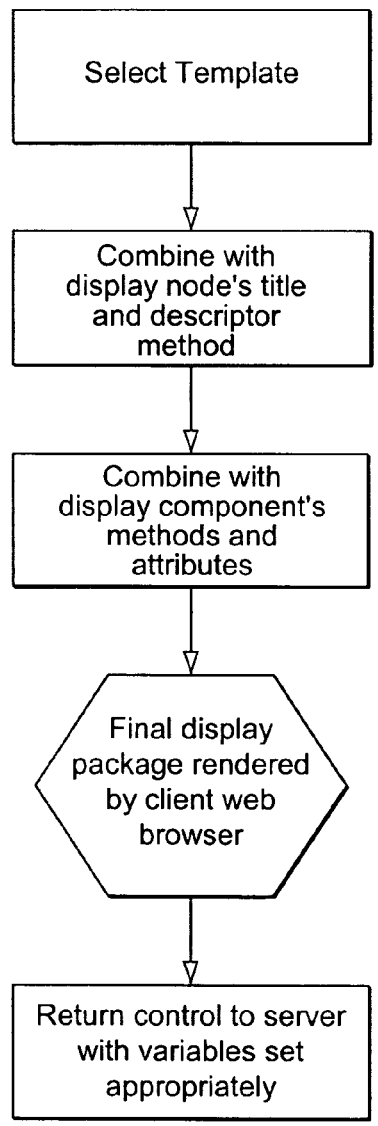
Dynamic display creation process
FIG. 10

Template-enabled browser device independence

Template-enabled personalization of broswer user interface

Overlapped Business Process Design and Website Design Methodology

Information and Control Flow

Opening Process Builder Screen

Category Properties

New Process Node

Checking Out A Process

Process Node Properties

List of Variable Types

Naming Variables

User Interface Block Node Properties

Component Definition Box, General Tab

Variable Definition Box, User Interface Block Node

Component Definition Box, Properties Tab

Selecting a User Interface Node

Interaction Node's Properties

Process Node Menu, Save Process

Login Process URL, Basic Fields

Task Node Properties

Step Definition Box

Selecting a Step Function

Database Variable Interface Options

Database Variables, Mapping Parameters

Decision Node's Properties Dialog Box

Decision Node Wizard Box

DBList's Properties Dialog Box

Data Node

Wizard Box

Node Components Properties Dialog Box

Do While Loop Node

Do While Loop Node's Properties Dialog Box

Do While Loop Node Wizard Box

DBList's Properties Dialog Box

Process Node Menu, Save Process

Login Process URL, Basic Fields

US 7,530,050 B2

METHOD AND SYSTEM FOR DEVELOPING SOFTWARE USING NODES

CLAIM OF PRIORITY

This application is a continuation-in-part of, and claims the benefit of Ser. No. 60/189,358, filed Mar. 14, 2000, which is fully incorporated herein by reference.

BACKGROUND OF THE INVENTION

1. Field of the Invention

This invention relates generally to methods and apparatus for the development of software, and more particularly to a method and apparatus that includes at least one user interaction which is executable using a web, voice, e-mail or wireless channel 2. Description of the Related Art The Internet has become a major channel for companies to conduct business. A wide range of business transactions including business to business, business to consumers, auctions, reverse auctions and vertical networks of businesses have driven growth. The unique aspects of this digital connectivity has spurred new forms of commerce transactions, eliminated geographic and time zone constraints, placed suppliers and customers in direct contact and essentially transformed the landscape of commerce. The speed of this transformation and the radical impact this has had on company fortunes has pushed businesses to rapidly recognize and re-engineer themselves, internally and externally with customers/suppliers, to get on the net.

The application of incorporating the web as a legitimate business channel has been a real struggle for most companies. Businesses have had to balance the pressures to 'get on the net' quickly against a long list of issues such as—what part of the company should get on the net first, how should this happen, developing an overall strategy for getting the entire company on the net, website design, connections to internal computer applications and applications, training, marketing/brand implications and significant ignorance of web technology and what e-commerce really mean. At one end of the spectrum, some companies have simply put up a website with basic company information (brochure-ware sites) and at the other end companies have defined and implemented comprehensive e-commerce strategies.

The complexities of defining what and how business will be conducted at the company website along with the intricacies of implementing the website and the myriad connections to internal applications has made the entire application extremely difficult to manage. A typical website implementation team consists of a few business domain experts but is largely dominated by web designers, content developers, database architects, middleware and other IT specialists. Given the large Web and IT focus on a typical e-commerce project, there is reduced emphasis on a clear definition of the business rules that must be implemented, disconnects between what the website implements and the required business application and most importantly, the inability of the website to respond quickly to business application/rule changes. This has resulted in companies changing business applications to accommodate website design and frustrated customers who do not understand the underlying business application and the critical connection between how the site must be used to get results.

There is a need for an efficient method for implementing websites based on clearly defined business rules and enable business objectives and business application capabilities to drive website implementation. There is another need for a method and apparatus creating software that eliminates the need for complex technical programming and maintenance for websites. There is a further need for a method and apparatus for creating software that defines complex business rules with a simple set of constructs.

SUMMARY

An object of the present invention is to provide an improved method and apparatus for creating software.

Another object of the present invention is to provide a method and apparatus for creating software in order to implement websites based on pre-defined business rules enabling business objectives and to enable business application capabilities to drive website implementation.

Yet another object of the present invention is to provide a method and apparatus for creating software that eliminates the need for complex technical programming and maintenance for websites.

A further object of the present invention is to provide a method and apparatus for creating software that is based on complex business rules defined with a simple set of constructs.

A further object of the present invention is to provide a method and apparatus for creating software for implementing a website that separates the business application and rules design from the graphic design/look & feel design of the website.

Another object of the present invention is to provide a method and apparatus for creating software that implements websites by separating the execution of business rules on a server from the rendering of the user interface on client machines.

A further object of the present invention is to provide a method and apparatus for creating software that combines dynamically created content with a template module to create customized look and feel based on personalization and other considerations.

Another object of the present invention is to provide a method and apparatus for creating software that combines dynamically created content with a template module to enable a physical media independent web device driver.

Yet another object of the present invention is to provide a method and apparatus for creating software that separates nodes and links both at a conceptual level and as permanently stored objects.

Another object of the present invention is to provide a method and apparatus for creating software using selected node layouts that represent a plurality of application logics.

Yet another object of the present invention is to provide a method and apparatus for creating software that uses a user interaction which is executable on multiple channels.

A further object of the present invention is to provide a method and apparatus for creating software with a user interface that includes GUI components and a template for the physical layout of static and dynamic portions of a user display.

Another object of the present invention is to provide a method and apparatus for creating software using nodes that are visual representations of software functions.

Yet another object of the present invention is to provide a method and apparatus for creating software by creating application logic that is directly executed without compilation of the application logic.

These and other objects are achieved in a method for creating software. A plurality of nodes and a directory of applications are provided. Each application is created by use of at least a portion of the plurality of the nodes. At least a portion of the plurality of nodes are selected to create a selected node layout that represent a plurality of application logics. The selected node layout is executed by a server program.

In another embodiment, a method for creating software provides a plurality of nodes and a directory of applications. Each application is created by use of at least a portion of the plurality of the nodes. At least a portion of the plurality of nodes are selected to create a selected node layout that represent a plurality of application logics. The application logic is defined by selecting at least one of GUI parameters and options in each selected node. The selected node layout is executed by a server program.

In another embodiment of the present invention, a method for creating software provides a plurality of nodes and a directory of applications. Each application is created by use of at least a portion of the plurality of the nodes. At least a portion of the plurality of nodes are selected to create a selected node layout that represent a plurality of application logics. External application interfaces are defined. The selected node layout is then executed by a server program.

BRIEF DESCRIPTION OF DRAWINGS

FIG. 7 illustrates the mapping of node and template elements to the physical website display.

FIG. 10 illustrates one embodiment of a layout of a template and the application for website screen display generation of the present invention.

DETAILED DESCRIPTION OF INVENTION

Figure 1:
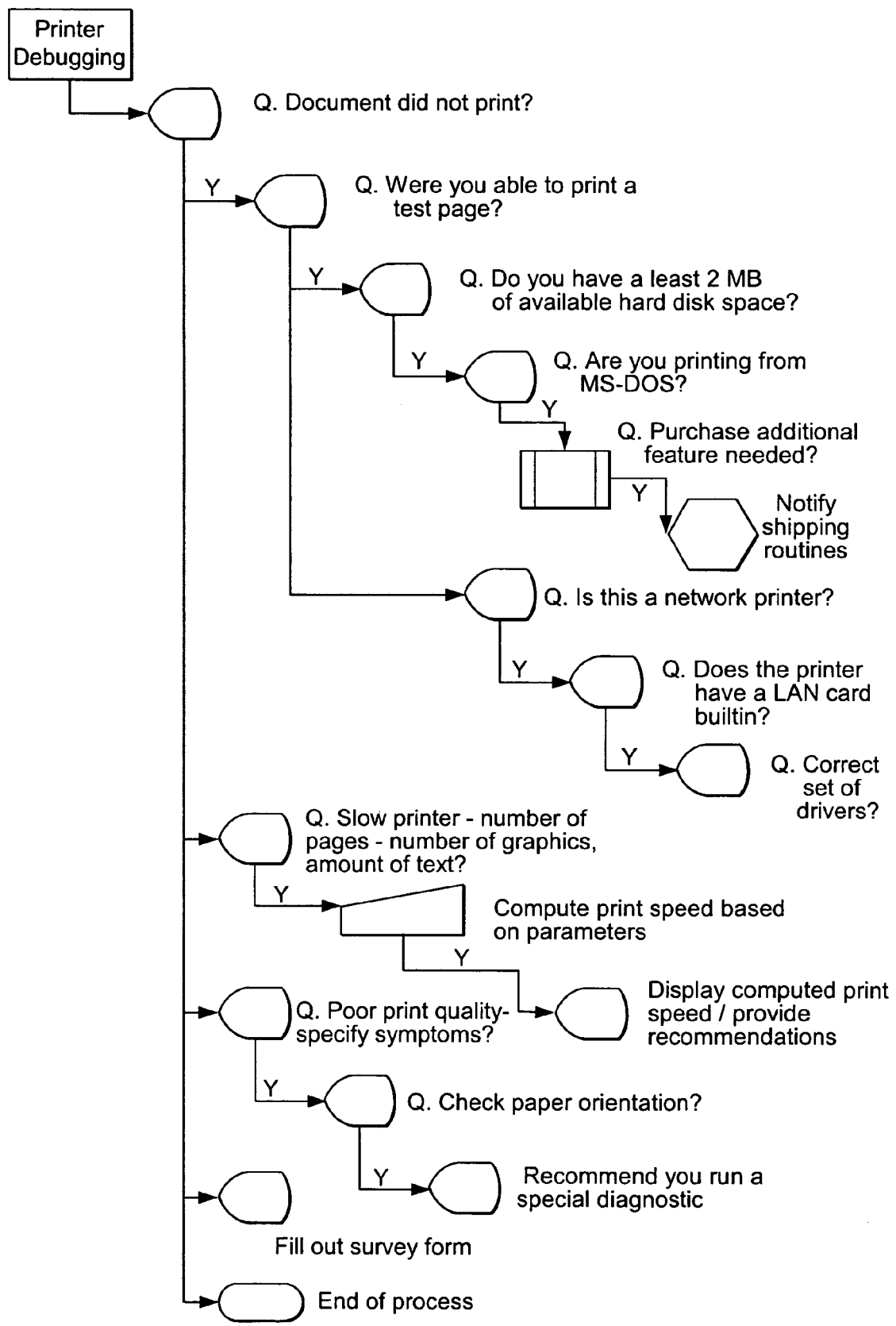
FIG. 1 is a flow chart illustrating one embodiment of the present invention using a solution engine that executes business application/rules defined in a knowledge base specified by analysts/online agents using a visual design tool.

One embodiment of the present invention is a method for creating software with a plurality of nodes and a directory of applications. Each application is created by use of at least a portion of the plurality of the nodes. At least a portion of the plurality of nodes are selected to create a selected node layout that represent a plurality of application logics.

The application logic is automatically validated against errors by validating each node in the selected layout against a pre-defined set of parameters and values. At least a portion of the plurality of the nodes are aggregated to create an aggregated node which represents an application logic. Created aggregated nodes can be reused as part of other application logics by making it a child of another node in the selected layout.

The selected node layout is executed by a server program.

The application logic is directly executed without compilation of application logic. Each node in the selected node layout is stored in the database alone with all the selected parameters and parent child relationships. Once the selected node layout is stored in the server database, the server program extracts the selected node layout from the database and executes a single node at a time. At least a portion of the application logics includes a user interaction. The user interaction permits a user to interact with the server program and is executable on multiple channels including but not limited to web, voice, e-mail and wireless channels. The user interface provides a way for the server program to display information to the end-user and to allow the end-user to respond or direct the execution of the server program.

Each node is a visual representation of a software function and includes inputs to a software function. The plurality of nodes includes a variety of different nodes including but not limited to the following: application node, user interface node, interaction node, data node, task node, decision node, while loop node, do while loop node, transaction node, rollback node, asynchronous node and wait node. The application node is the root node and is used to define the global properties of the application, including but not limited to variables and constants. The application assigns a sequence of nodes and actions for a specific purpose.

Individual node execution measurements include usage counts, total execution time, average execution time and the like. A descriptive view provides details of the functional use of the selected layout. A history of different versions of the application logic is provided. Access control to the application logic permits a single access by only one user at a time for purposes of modification and multiple access for purposes of viewing.

The user interface node preferably has GUI components and a template for the physical layout of static and dynamic portions of a user display. Templates are HTML files that determine how the information identified in the User Interface, User Interface Block, and Interaction nodes is displayed. Templates provide the look and feel of user interaction.

Templates and template components are applied in the Interaction node and User Interface Block node components, respectively. Can apply a template to the Interaction node by assigning a template name as a value for the Template property. If you do not assign a value to the Template property, the default template will be applied.

Dynamic portions of the user display are used by the server program at run-time to layout application specific GUI components. At run-time the server program loads the defined template, dynamically generates the GUI component definitions and populates the dynamic portion of the template.

The user interface node, user interaction block and interaction node create a screen that is viewable by the user. The user interface block node is the child of user interface node and is used to create GUI components such as text or text boxes. The interaction node is used to display information to, receive information from, and send information to the user. It is also used to create an interaction using one or more user interface nodes.

The data node applications information and manipulates the data throughout the entire selected node layout, including but not limited to performing functions, tasks, evaluating expressions, assigning values to variables, embedding Java and the like. The task node interfaces with external systems or other applications based on predefined interface manager definitions. The decision node creates a condition or business rule within the user's application. The condition or business rule must be true or false in order for the application to move to the appropriate next step. If the condition or business rule is true, the application proceeds along "Path A" and along "Path B" when it is false. A loop is created by the while loop within the application as long as a certain condition remains true.

The while loop node checks the condition before beginning the loop. The do while loop is another node that creates a continuous loop within the selected node layout as long as a certain condition remains true. The do while loop is similar to the while loop except that it checks the condition after the first loop has been executed. The transaction node is used to mark the beginning of a transaction. Any children of the transaction node are included in the transaction. The transaction is rolled back if either a rollback node is encountered or any error occurs. The Rollback node is used for an explicit roll back of the transaction node and is a descendent of a transaction node. The asynchronous node is used to conduct a parallel execution of the child branch. The wait node is the parent node of the asynchronous node and waits until a specific condition is met or all child asynchronous nodes are done applicationing. Then, the rest of the application continues.

A node palette contains the user Interface, user interface block, interaction, data, task, decision, while loop, do while loop, transaction, rollback, asynchronous and wait nodes. The Application Diagram is the workspace for building applications. Nodes are added to the application by clicking and dragging the node type from the node Palette onto the application diagram. Properties for each node as needed by right-clicking on the node and entering information in properties dialog boxes. The application is then saved, tested and implemented.

Software programs that are created are organized in a hierarchical structure. A node palette lists the node types available for building the software application. Nodes are the building blocks for a application. Software developers use a application diagram as a workspace. Nodes are used to build applications. To create software, specific tasks that each node is to accomplish are defined and their sequence is established. Node properties include, (i) variables to store data with constant values, calculated values, or interactive result values, (ii) components that are defined within the user interface block node and used to present and collect information between the application and the user, (iii) expressions that define the values to be stored in the variables, including operators such as math functions, Boolean operators, date/time functions, and the like.

The look and feel of the user interface is created with the use of the user interface, user interface block and the interaction nodes. These nodes are used create the blank form, add information to that form, and then display the information to, and receive the information from, the software developer. These nodes define how the information is seen by the software developer. Templates are visual renditions of a user Interface node and can be designed in an external system.

The method and apparatus of the present invention can be used for defining a business application and associated business rules along with a corresponding user interface to generate a fully functional and scaleable website. Business rules are defined and a user interface created to deliver services, products and information over the Internet.

An operational website is created that implements these rules for use by website users using web browsers on client machines.

The business rules and the user interface elements are defined using a visual definition tool on a server machine. The business rules define all the services provided at the software consisting of business application elements such as global variables, applicationing elements, conditional elements and flow of control rules. The user interface elements and the methods to manifest these elements are kept separate-enabling enforcement of corporate look & feel standards, industry elements, frame-specific functions, personalization and device independence. The server system stores the business rules and the user interface elements in a repository and uses this to generate a website.

As customers and other users request services from this website, the server system uses the pre-defined business rules to analyze the customer's request, execute the corresponding business rule—which may consist of checking the user request/input with a backend system, performing some calculations—and based on the result perform a wide range of actions from simply serving up a specific user interaction or interfacing with an external application to exchange information and respond to the customer request. All of the interaction with the customer is performed using the user interface elements defined. These interface elements consist of a standard look and feel elements and also a set of user-definable display objects. Customers can define an attractive, engaging interface that is also powerful.

FIG. 1 provides an overview of the components of a complete website consisting of web servers connected on one side to the end-users via the Internet and on the other side to a backend complex comprising functional servers, interface routines and analyst/management tools. Specialized routines on the web servers interface with the solution engine using networked objects to track, control and manage user sessions. The solution engine, in turn, interfaces with specialized engines such as the observation, personalization and pricing engine as directed by specific nodes. A pool of standard interface routines is provided to allow the specialized engines and analyst/management tools to access databases, external applications and service providers.

Figure 2:
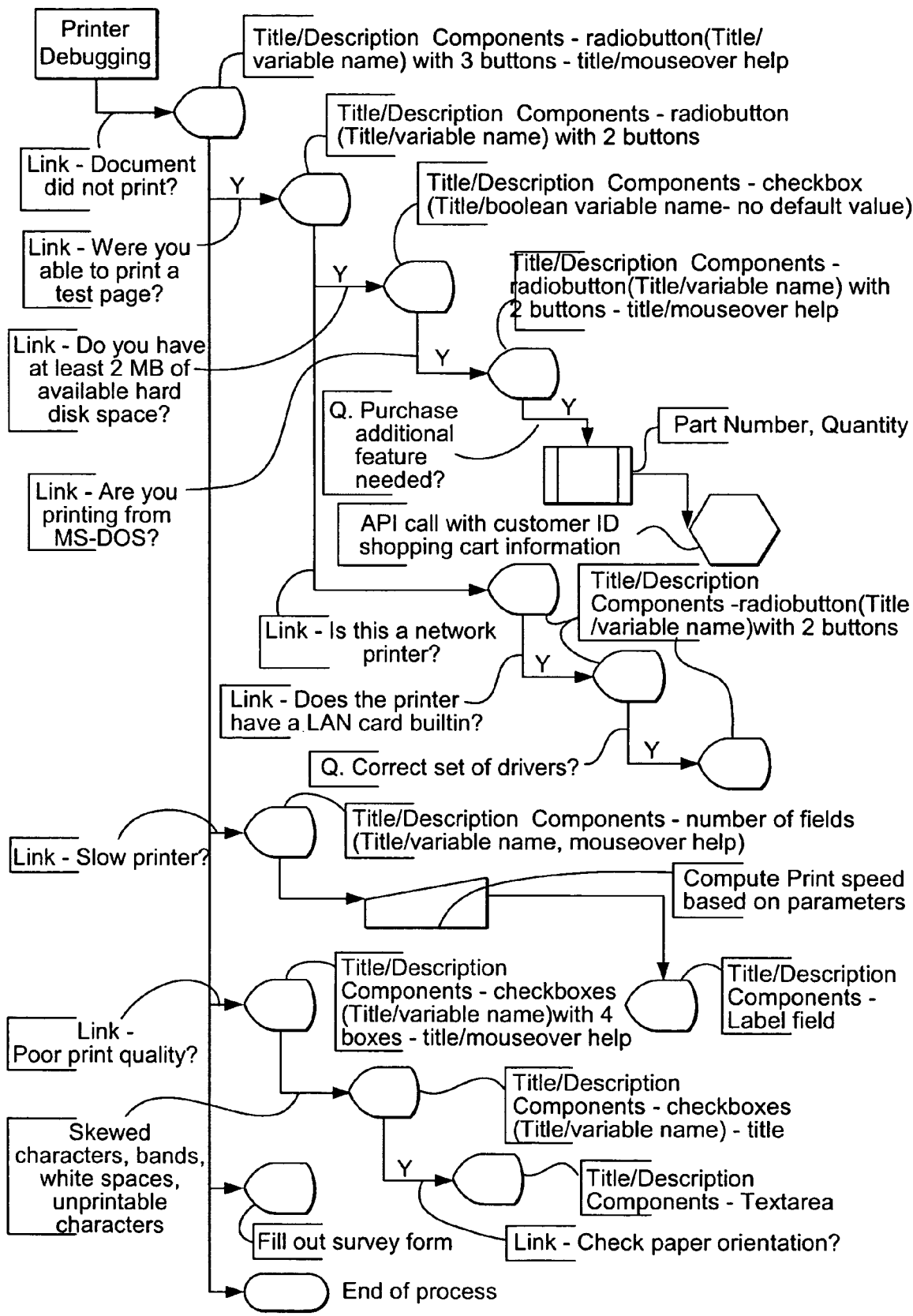
FIG. 2 is a flow chart illustrating a specific business application that can be used with the present invention, and depicts the steps in diagnosing and recommending a work-around/solution for problems associated with a printer connected to a personal computer.

A representative business application is described in FIG. 2. In this instance, the sequence of steps describing the service application for a customer having a problem with a printer is shown and is typically what company service representatives would use. Key paths that are followed include, (i) functional checks, did the document print?, performance checks, is the printer printing slowly and (iii) quality checks, is the print quality poor.

In the functional track, the questions 'were you able to print a test page'; 'do you have at least 2 MB of available hard disk space' focus on a missing piece of software that is downloaded/shipped once this is confirmed. A second path of diagnostic questions 'is this a network printer'; 'does the printer have a built-in LAN card' is asked to identify an incorrect set of installed drivers. The next diagnostic path focuses on potential performance problems 'is your printer printing slowly' and verifies performance parameters to check against benchmarks and based on any identified anomalies recommends a course of action. The final diagnostic path focuses on quality-related issues 'is your print quality poor' and recommends some steps based on the specific quality issues identified. For each of these, diagnostic paths, escalation to a specialist is recommended if any of the diagnostic questions results in a negative response.

In one embodiment of the present invention, a visual design tool is used to layout the business application described in FIG. 2 along with additional information describing display elements, including but not limited to text, graphics and the like, used to interact with the end customer on a web browser. This is more fully shown in FIG. 3. These display elements can be specified directly or sketched out in a web page design tool and imported. Each of the nodes is connected to another via a link node that specifies a set of conditions that must be tested before a path is traversed.

Figure 3:
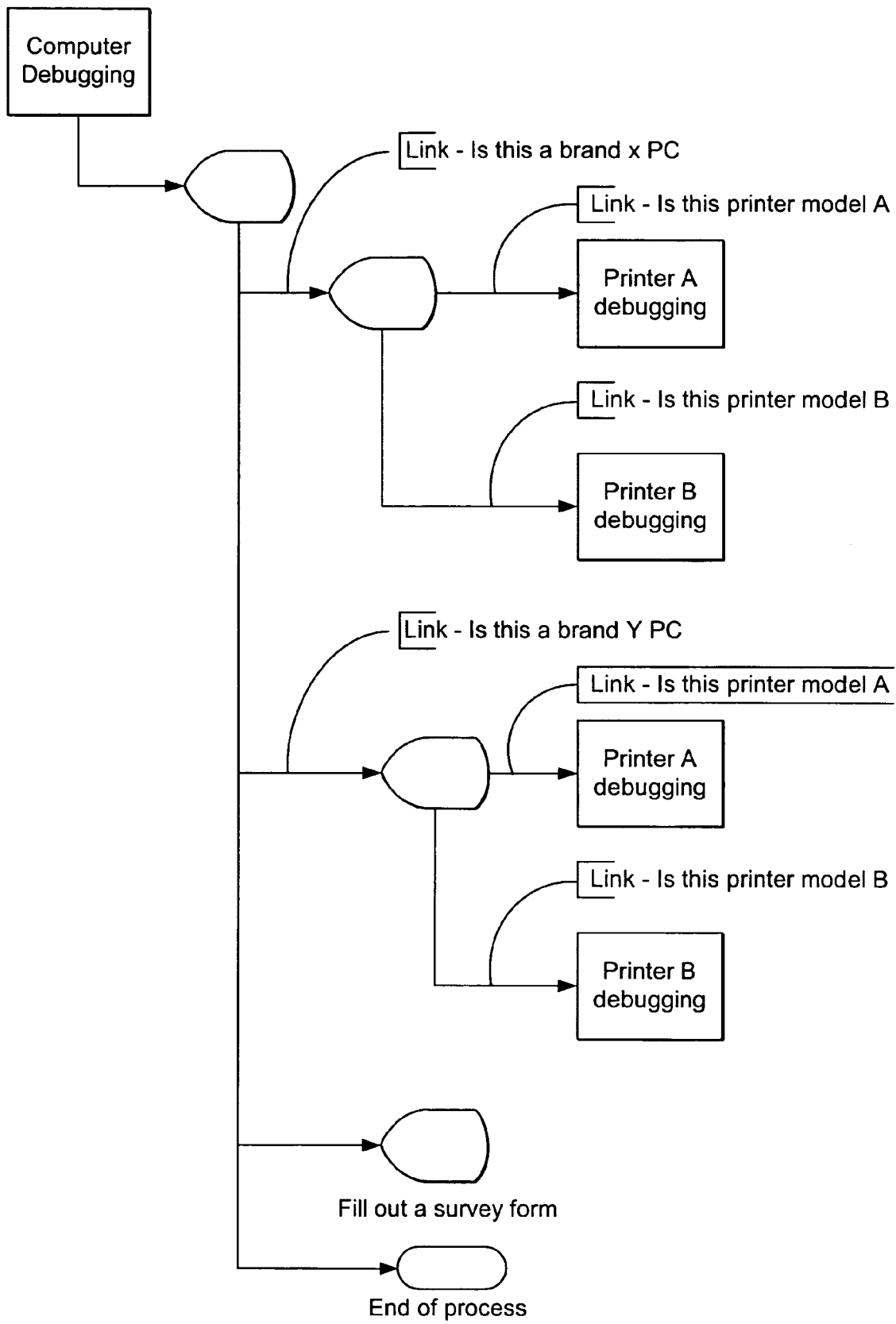
FIG. 3 is a flow chart that illustrates elements used to represent a business application and business rules—nodes and links used by the present invention.

Mapping between the business application is illustrated in FIG. 2. The website specification of FIG. 3 is almost identical except for the additional display content specific information. The application, rules and display content are stored in a knowledge base. At this point the website is fully operational and ready to application any requests relevant to this application.

Figure 4:
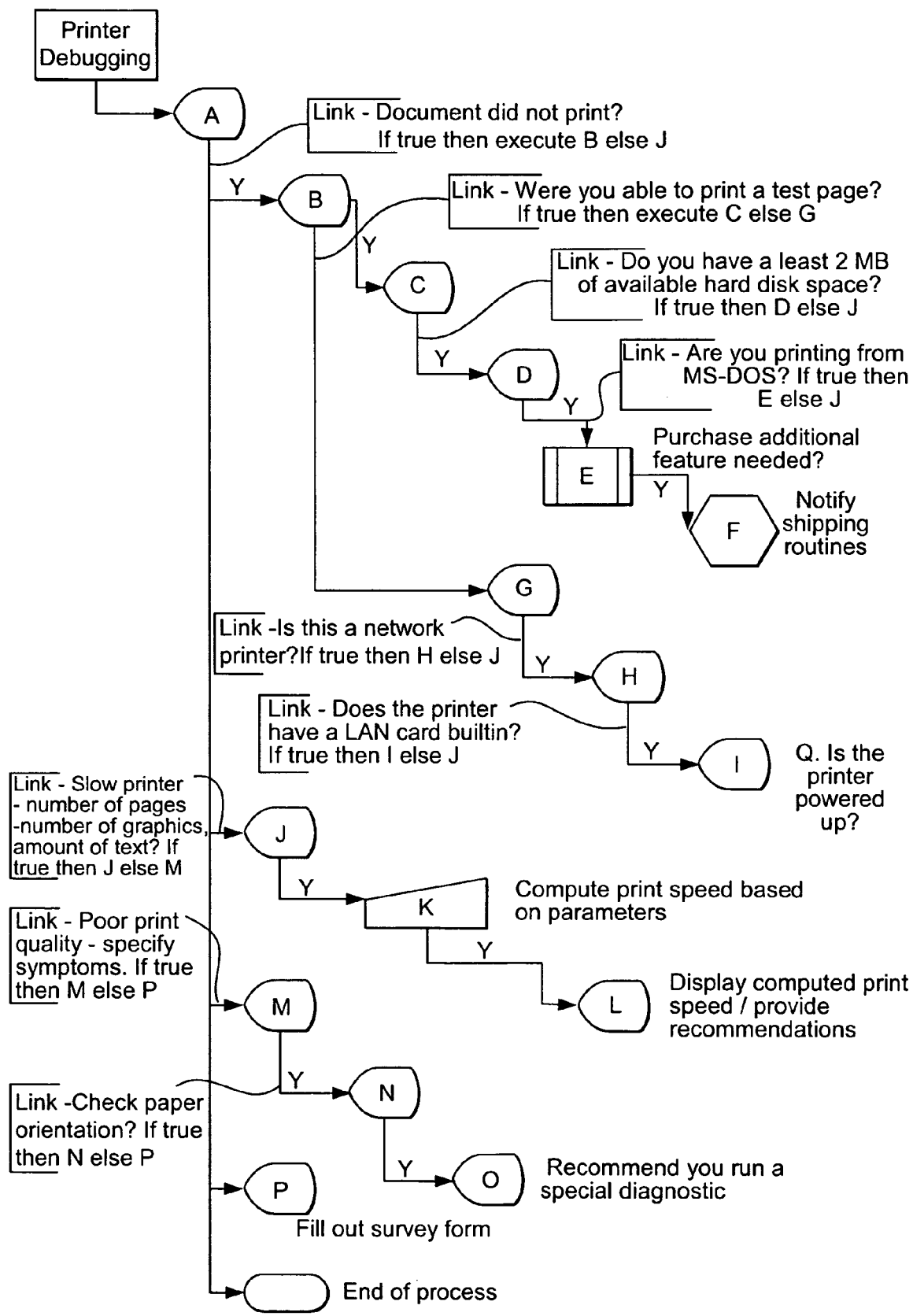
FIG. 4 is a flow chart that represents an embodiment of the present invention where a application defined to assist in debugging problems with a specific model of a printer is reused and operates differently based on the context.

FIG. 4 represents a general application for assisting users with a range of PC-models configured with a range of printers. The diagnostic application for isolating and resolving problems with an 'A'-model printer is shown being reused in multiple PC-type contexts. Based on the context of the invocation, the printer debugging application can be designed to operate differently.

A server system is used to implement the website and receives control when a client web browser issues a connection request to a specific pre-defined web page located on the server as shown in FIG. 1. This web page is associated with a specific application. When a client browser signals applicationing complete for this page, the server receives control and signals the solution engine with the application-id and any parameters passed from the client browser. The solution engine applications the tree of nodes and links associated with this application-id.

Figure 5:
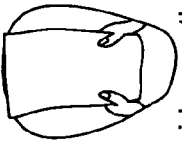
FIG. 5 illustrates the use of nodes and links to represent the business application shown in FIG. 2 and the applicationing sequence used by the solution engine.

FIG. 5 illustrates the applicationing logic for the application defined in FIG. 2 and FIG. 3. Node A represents the first page displayed by the client browser and the link (Document did not print?) is tested. If this is tested true node B is applicationed; else the next link (Is the printer slow?) is evaluated. In general, the server system evaluates a link and if the condition is true applications the next node and its child nodes until it encounters a link that tests untrue or reaches the last node in a chain. When this happens, it reverses its execution path till it encounters a node that has a child on an untested path and tests the link on the path if one exists before applicationing the child node. Essentially, every path stemming from a node is tested before the server system continues on its reverse path. This is done until all paths have been traversed; at which point the server system deems the application completed.

Figure 6:
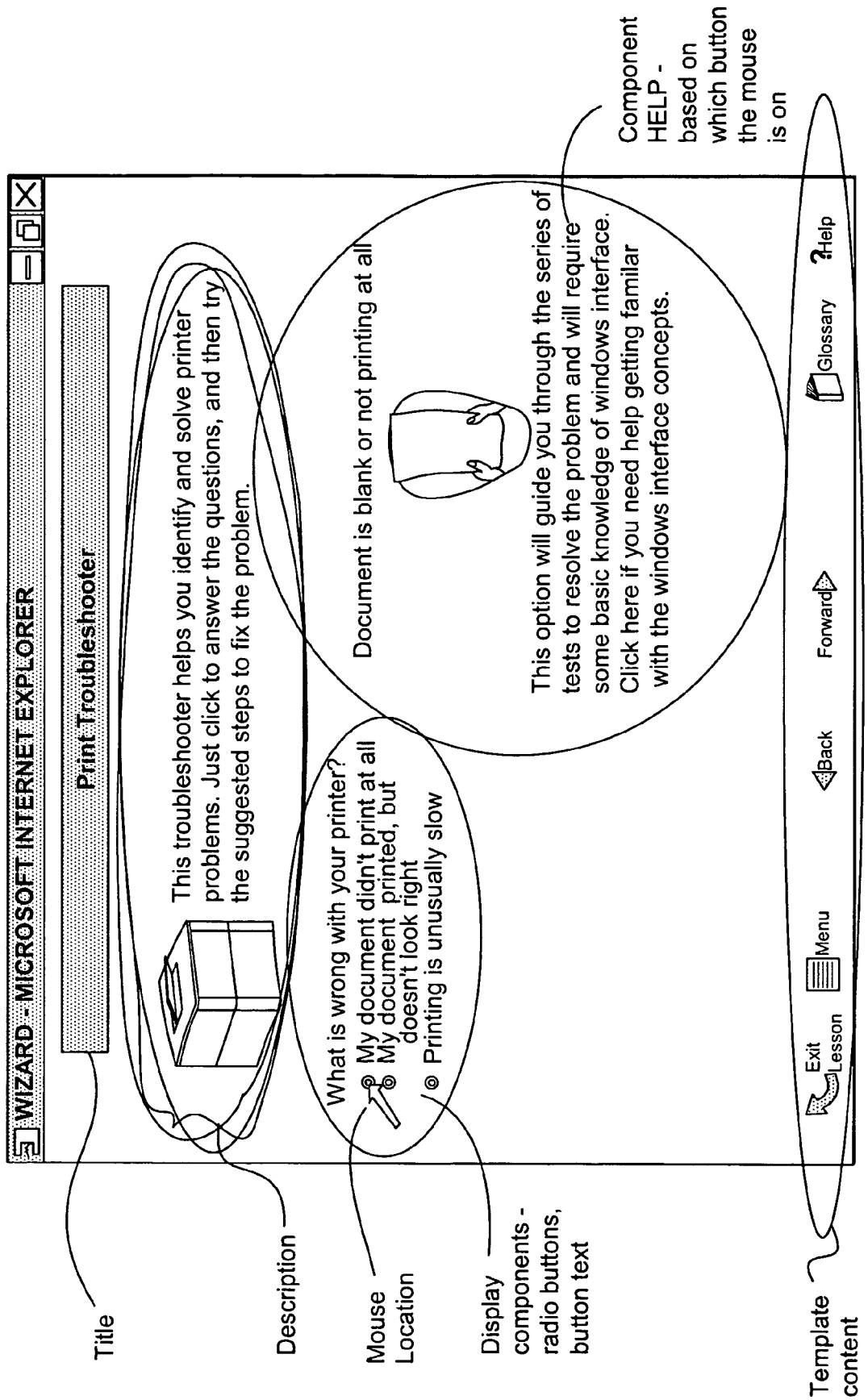
FIG. 6 is a sample screen shot from a website that was generated using rules defined in FIG. 5.

FIG. 6 illustrates a web page generated by the server system based on the application, rules and display specifications in FIG. 3. The server generates this page using display specifications in a template page and overlaying this with display components from the business application map, see FIG. 3. The title, description, display components and associated HELP are directly derived from the business application map. Positioning of the mouse pointer and the related HELP content pop-up are examples of the dynamic, content specific information that can be displayed. As the mouse moves over the other choices on FIG. 3, the component HELP associated with that choice is displayed.

Figure 8:
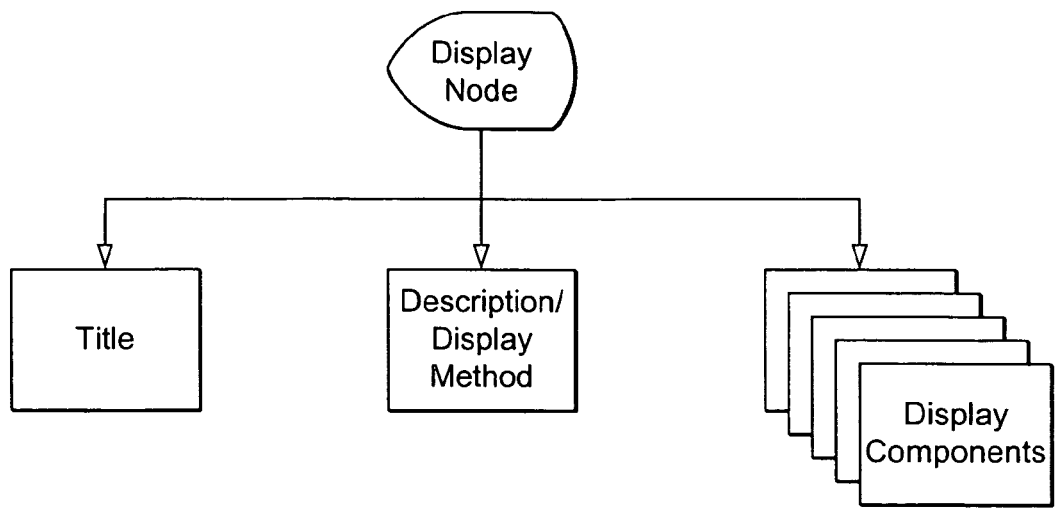
FIG. 8 illustrates a representative set of nodes, of the present invention, and their associated capabilities.
Figure 9:
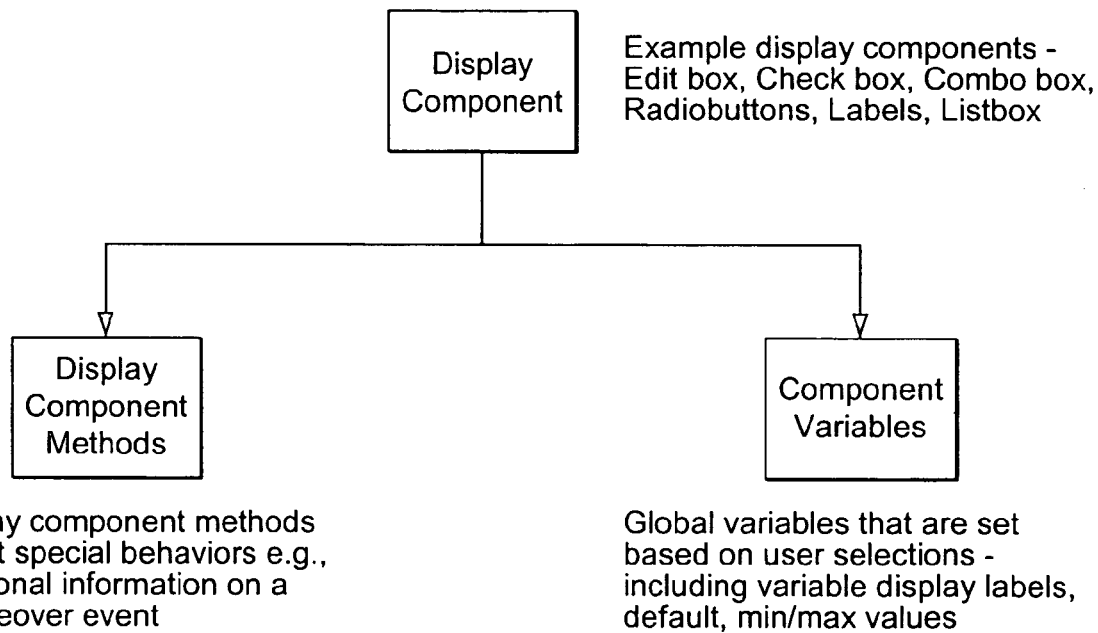
FIG. 9 is a schematic illustration of one embodiment of the display node and the display component of the present invention.

A basic set of building blocks for defining a website is shown in FIG. 8. These blocks include nodes that provide applicationing capability and links that test for conditions to enforce business rules. Based on the specific application being defined appropriate nodes are selected to represent the actual business application. Additional node types may be defined as needed. The display node represents an interaction with a web client browser and may be used to specify the content and layout of a web page. The structure of the display node, as shown in FIG. 9, consists of a foundation page consisting of static content (Title, Description) and display components that represent interactional elements used to display content and accept user input interactively. Display components as depicted in FIG. 10 consist of display widgets, associated content/text, HELP text and variables associated with the selection with defaults, min/max settings as appropriate. The defaults and min/max values can be set to variables as opposed to constants providing additional flexibility. The HELP text is, in one embodiment, displayed as a mouse rollover event.

Analysts using the visual design tool to layout a business application using display nodes can do so without any consideration of the physical device that will be used to interact with the web client. These display nodes are simply stored as text, content, widgets and HELP content in the knowledge-base.

Templates enable the physical manifestation of display nodes, which contain the logic and additional content. They use the data associated with the display node to interpret and convey text and content and most critically, they define the behaviors of the display components. This enables a display node to drive a web browser on a PC, or a web browser on a cellular phone or a conventional telephone dialed in to a Computer-Telephony-Integration enabled browser.

Figure 11:
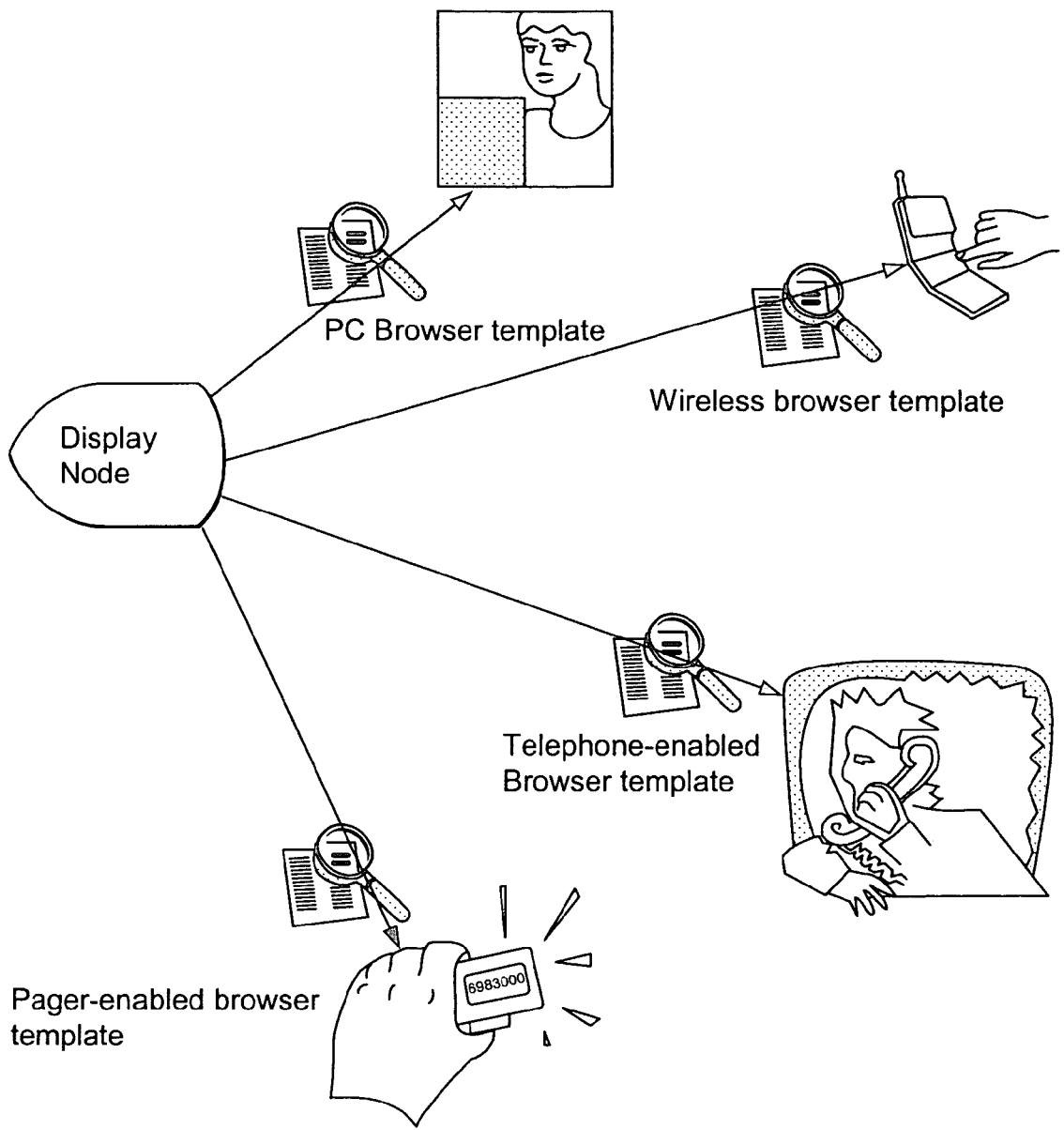
FIG. 11 illustrates how template based interaction of the present invention provides a method for user interactions to be defined and implemented independent of the physical characteristics of the user device.
Figure 12:
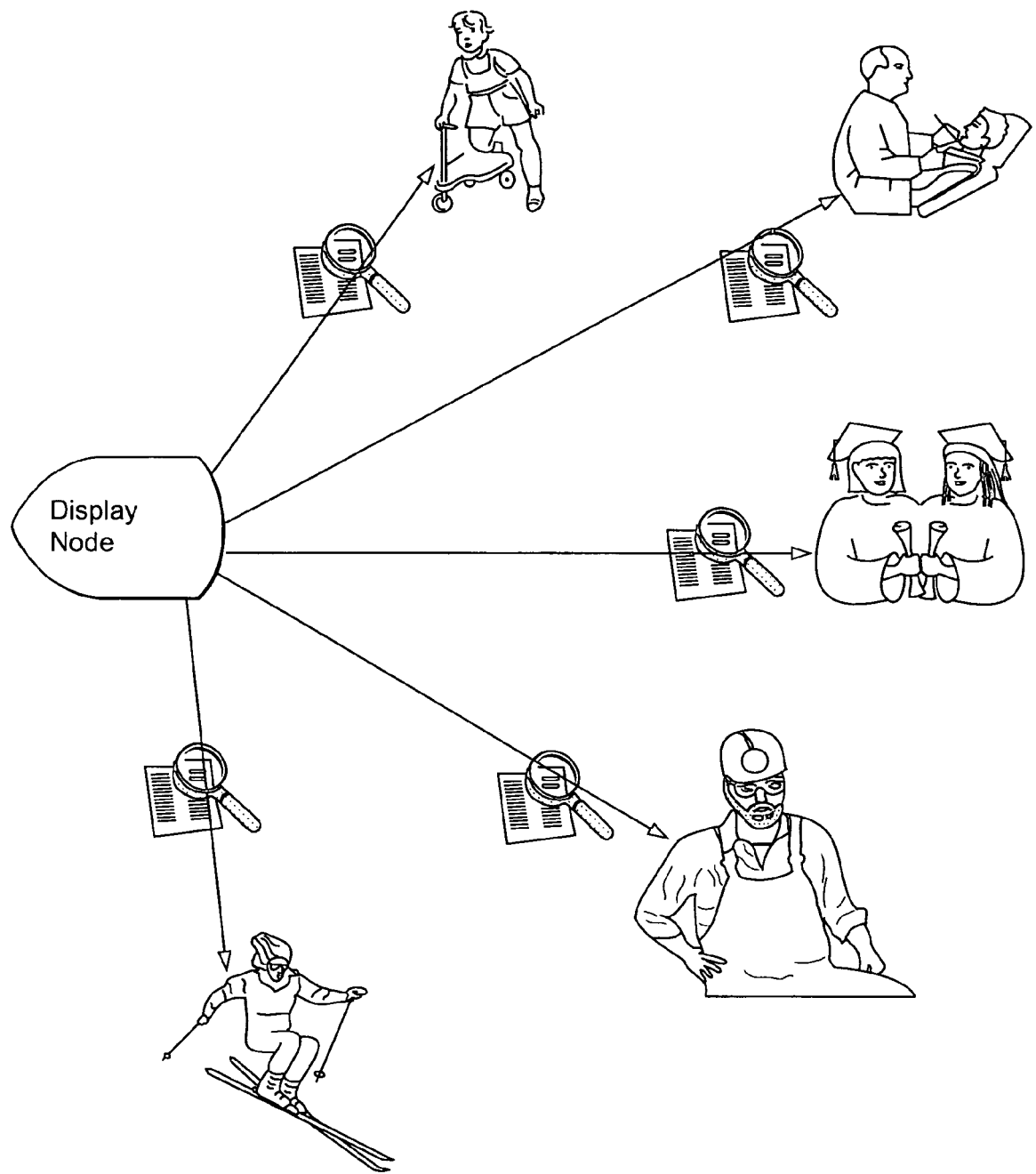
FIG. 12 illustrates how template based interaction of the present invention enables personalization—to display user relevant content and user preferred display formats.

FIG. 11 illustrates the role of the template in the applicationing of interface nodes. Templates may be viewed as the engine that is fueled by the display node logic and contents. A single type of fuel (display node content), as in FIG. 12, drives many engines—cell-phone enabled browsers, telephones, and conventional PC-based browsers, handheld PDAs etc. Additionally, engines may be used to provide many forms of personalization (FIG. 12) based on the end customer—a regional, ethnic, professional look and feel.

Figure 13:
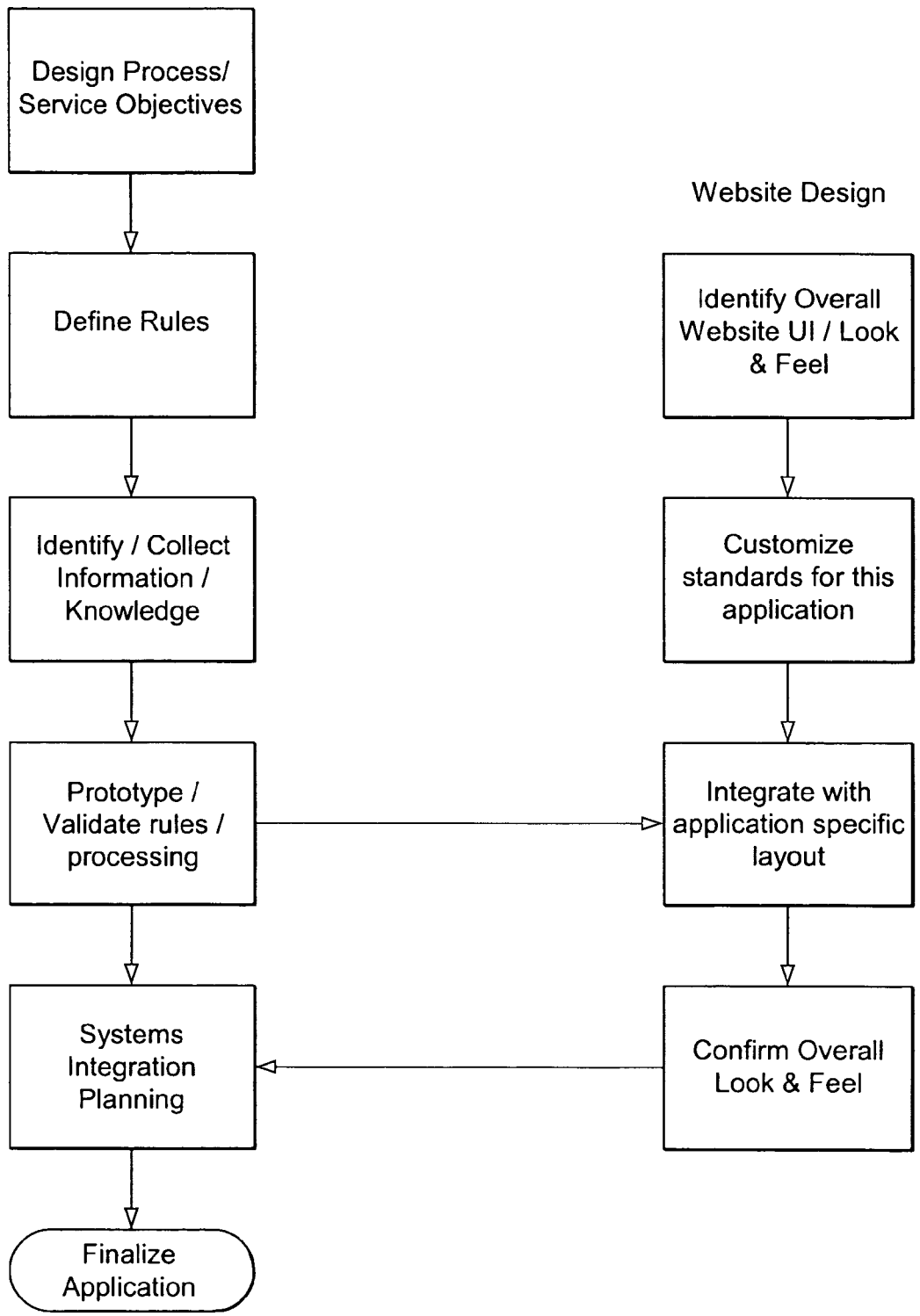
FIG. 13 is a flow chart that illustrate one embodiment of a methodology of the present invention for concurrent business application definition and web-site design.
Figure 14:
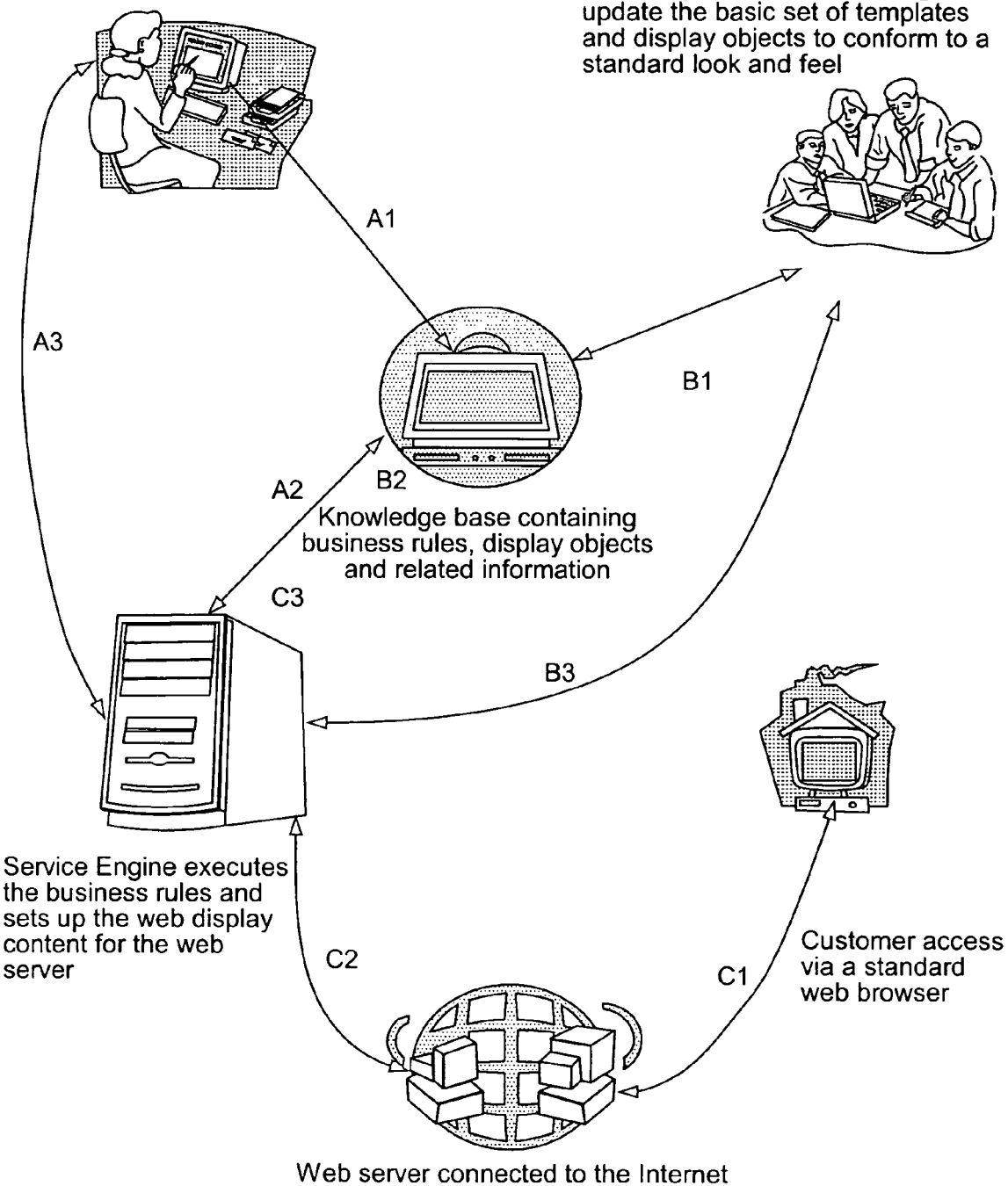
FIG. 14 is a flow chart that illustrates one embodiment of the present invention of a complete view of applications isomgtje FIG. methodology.

FIG. 13 illustrates a methodology that facilitates rapid implementation of website solutions. The delineation of business application and rules definition from the technical details of website user interface design are uniquely enabled by this invention. FIG. 14 illustrates the flow diagram in the three key use models for a website designed based on the principles described by the present invention.

EXAMPLE 1

The following sections outline the steps taken to build a simple login application, which consist of:
Presenting an opening screen to the user.
Requesting the user ID and password.
Verifying the user ID and password.
Issuing an error message for incorrect logins.

SUMMARY

The following is a summary of the steps taken to complete a sample application:.
Identifying A Application
Outlining the Application Sequence
Building a Application with Application Builder
Opening a Application Step 1 Start Application Builder.

Step 2 Add a new category.
1 Right-click on the root Application node.
2 Select New Category.
3 Right-click the new Category folder.
4 Specify a name for the category.
5 Click OK.

Step 3 Select a new application to build.
1 Right-click on the category folder just created.
2 Select New Application.

Step 4 Check out the application for editing.
1 Right-click on the Application node.
2 Select Check Out.

Step 5 Name the Application.
1 Double-click on the Application node.
2 Type a title and name for the new application.
3 Click OK.

Defining Variables

Step 1 Create Variables.
1 From the Application node's properties dialog box, click the New button.
2 Type a name for each variable as it is added.

Step 2 Select the Variable type.
1 Click on the Type column box.
2 Scroll through the list and select a type.
3 Click OK.

Defining User Interaction

Step 1 Add a User Interface Node.
1 Go to the Node Palette.
2 Add a User Interface node to the Application Diagram.
3 Double-click on the User Interface node.
4 Type a title and name for the new node.
5 Click OK.

Step 2 Add a User Interface Block Node.
1 Go to the Node Palette.
2 Add a User Interface Block node to the Application Diagram.
3 Double-click on the User Interface Block node.
4 Type a title and name for the new node.
5 Click OK.

Step 3 Select a Component.
1 Double-click on the User Interface Block node.
2 Double-click on a component type in the Available Component list.

Step 4 Define the Component.
1 Type a title and name for the component.
2 Map a variable to the component.
3 Define additional variables as needed.
a Click the New button on the General tab.

b Enter the variable Name.
4 Select a User Interface type for the component.
  a Click on the drop down list in the UI Type field.
  b Choose one of the UI Type options.
5 Define properties for the component.
  a Click on the Properties tab.
  b Type in property values.

Step 5 Add an Interaction Node.
  1 Go to the Node Palette.
  2 Add an Interaction node to the Application Diagram.
  3 Double-click on the Interaction node.
  4 Type a title and name for the new node.
  5 Click OK.

Step 6 Map a User Interface Node to the Interaction Node.
  1 Double-click on the Interaction node.
  2 Select from the list of User Interface nodes.
  3 Click Add.

Step 7 Define the Interaction Node's Properties.
  1 Click on the Properties tab.
  2 Type in property values.
  3 Click OK.

Step 8 Verify the Component Display on the Website.
  1 Save the application.
  a Right-click on the Application node.
  b Select Save.
  2 Find the Application node's ID.
  3 Open a web browser.
  4 Determine the Intranet path to the Application URL.
  5 Specify the application ID found in SubStep 2b as the last six digits of the URL.
  6 After review, return to the Application Builder.

Defining the Database Information Used to Verify a Login

Step 1 Add a Task node.
  1 Go to the Node Palette.
  2 Add a Task node to the Application Diagram.
  3 Double-click on the Task node.
  4 Type a title and name for the new node.
  5 Click OK.

Step 2 Add a Step to the Task Node.
  1 Display the Task node's properties dialog box.
  2 Add a step.

Step 3 Define the Step Function of the Step.
  1 Specify a name for the step.
  2 Select a function for the step.
  3 Select an interface.

Step 4 Create a DB List variable.
  1 In the Interface area, click the New button.
  2 Type a name for the DB List variable.
  3 Select a Return Value from the drop down list.
  4 Enter Input and Output parameters.
  a Click on the Variable field for each Input and Output Column Name.
  b Scroll through the list and select a variable.

Setting Up for a Message Response

Setting Up a Condition

Step 1 Add a Decision Node.
  1 Go to the Node Palette.
  2 Add a Decision node to the Application Diagram.
  3 Double-click on the Decision node.
  4 Type a title and name for the new node.
  5 Click OK.

Step 2 Define the Decision Node Conditions.
  1 Open the Decision node's properties dialog box.
  2 Right-Click on the IF in the large text box.
  3 Select one of the listed options.
  4 Enter a Description.
  5 Select a DBList variable.
  6 Select an Operation.
  7 Click OK.

Setting Up Retry Attempts

Step 1 Add a Data Node.
  1 Go to the Node Palette.
  2 Add a Data node to the Application Diagram.
  3 Double-click on the Data node.
  4 Type a title and name for the new node.

Step 2 Define the Data Node.
  1 Open the Data node's properties dialog box.
  2 Create Rules for the Data Node.
  a Click New in the Rules box.
  b Select a Wizard.
  c The Node Components Properties dialog box is displayed.
  3 Enter a description.

Step 3 Map the Component to the Data Node.
  1 Map the rule to the User Interface Block node.
  2 Select a component.
  3 Define the properties of the component.
  a Enter text for the Caption property.
  b Select a value for the Visible property.
  c Click Apply.
  d Click OK.
  4 Check the new rule.

Defining a Loop

Step 1 Add a Loop Node.
  1 Select a type of Loop node.
  2 Go to the Node Palette.
  3 Add a Do While Loop node to the Application Diagram.
  a Drag the Do While Loop node over the intended parent node.
  b Move the branch that will make up the loop application into the position of the Do While Loop node's children.
    i Copy the branch.
    ii Paste the branch.
    iii Remove the old branch.
    iv Reactivate the User Interface node in the Interaction node.
  4 Double-click the Do While Loop node.
  5 Type a title and name for the new node.
  6 Click OK.

Step 2 Define the Do While Loop node's Conditions.
  1 Open the Do While Loop node's properties dialog box.
  2 Right-click on the DO WHILE in the large text box.
  3 Select one of the listed options.
  4 Enter a description.
  5 Select a DBList variable.
  6 Select an Operation.
  7 Click OK.

Saving the Application

Step 1 Save the Application.
  1 Complete the application.
    a Right-click on the Application node.
    b Select Save.
  2 Find the Application node's ID.

Testing the Application

Step 1 Verify the Application Display on the Website.
  1 Open a web browser.
  2 Determine the Intranet path to the Smart eBusiness URL. Specify the application ID number found in SubStep 2b as the last six digits of the URL.

For purposes of this specification, a application is a sequence of events, organized in a collection of nodes and variables, that define how to conduct business. A application can be an internal procedure or a customer interaction. Prior to building a application a software developer determines:
  The objectives of the application.
  User levels, input, and response.
  Data requirements.
  Applicationing steps.
  Constraints.
  The order of application events.

Building a application is a collective activity that includes:
  Defining the needs of the application.
  Storyboarding or outlining the planned flow of the application.
  Using Application Builder, proceeding by:
    Selecting an existing application or creating a new application from the Application directory.
    Checking out the application from the Application Diagram.
    Adding nodes to the application by clicking and dragging the node type from the Node Palette onto the Application Diagram.
    Defining the properties for each node as needed by right-clicking on the node and entering information into the properties dialog boxes.
    Saving the application.
    Testing the application.
      Executing the application by specifying the unique application identification in the URL of a web browser.

When a application is built using Application Builder, the activities include:
  Checking out a application for editing.
  Defining variables for the login application.
  Defining the interaction between the user and the application—how the user will supply the login information.
  Defining what database information will be compared to the user login information.
  Defining steps for an incorrect login:
    Setting up an error message response.
    Setting up a condition.
    Setting up retry attempts.
    Defining a loop to cycle through login and verification.
    Defining action to be taken through a login retry loop.
      Saving the login application.
      Testing the login application
      Executing the login application. .

Opening a Application

A application can be opened by either double-click an existing application or opening a new application from the Application directory. All applications must be checked out from the application diagram area to enable editing.

Figure 15:
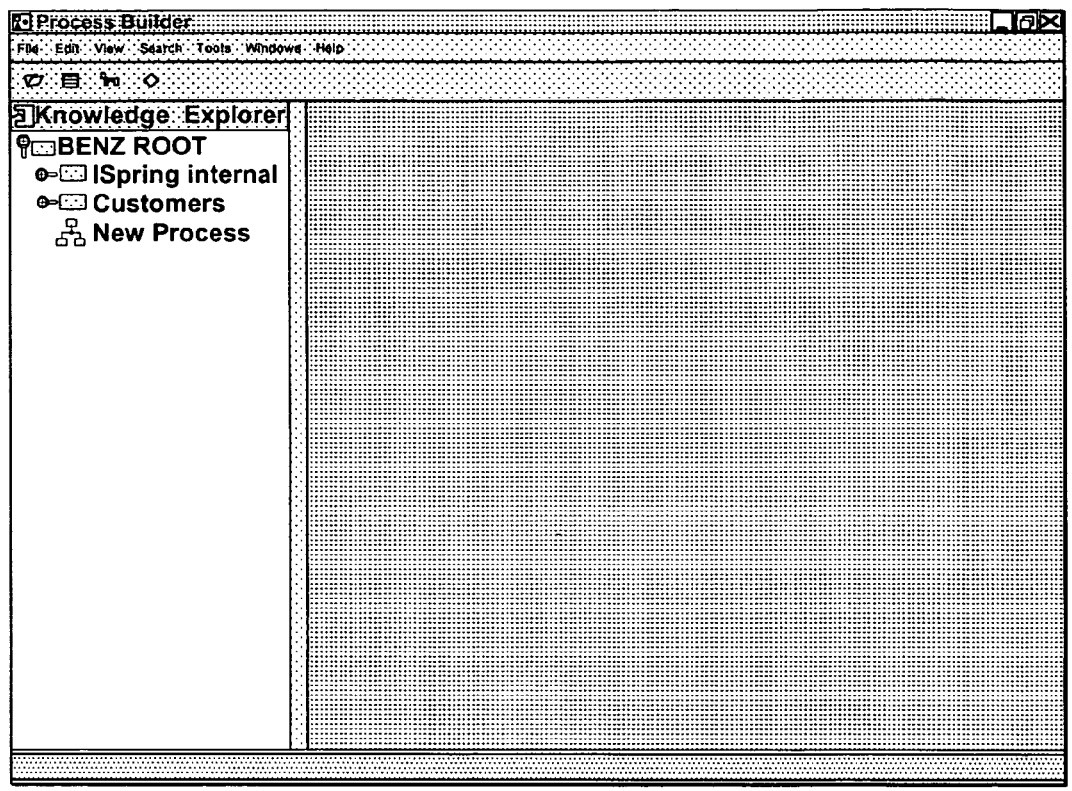
FIG. 15 is a screen shot of an application builder screen.
Figure 16:
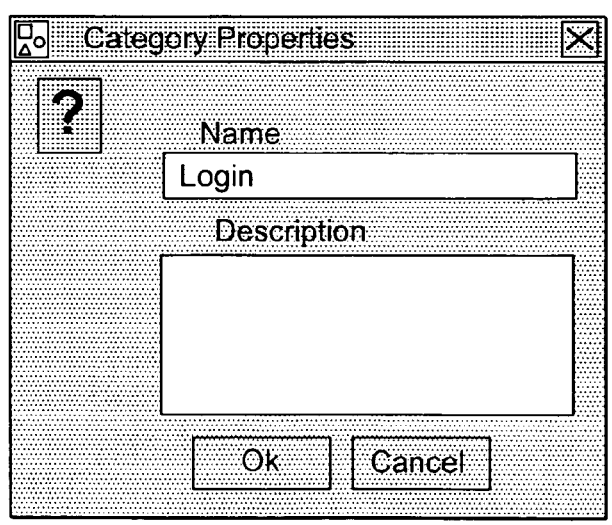
FIG. 16 is a screen shot of a log-in into the application builder.

Step 1 Start Application Builder.
  The Application directory is displayed with the root Application node and any other applications that are defined. See FIG. 15.

Step 2 Add a New Category.
  The Category folders are for organizational purposes only and are not required for building a application.
  1. Right-click on the root Category.
  A menu is displayed.
  2. Select New Category.
  A new Category folder is added to the Application directory.
  3. Right-click the new Category folder.

Select Properties

The new Category's properties dialog box is displayed.
  4. Specify a name for the category and a description, if needed.
  The sample is named Login. See FIG. 12-2.
  5. Click OK.
  The category folder is now labeled with the new name.

Figure 17:
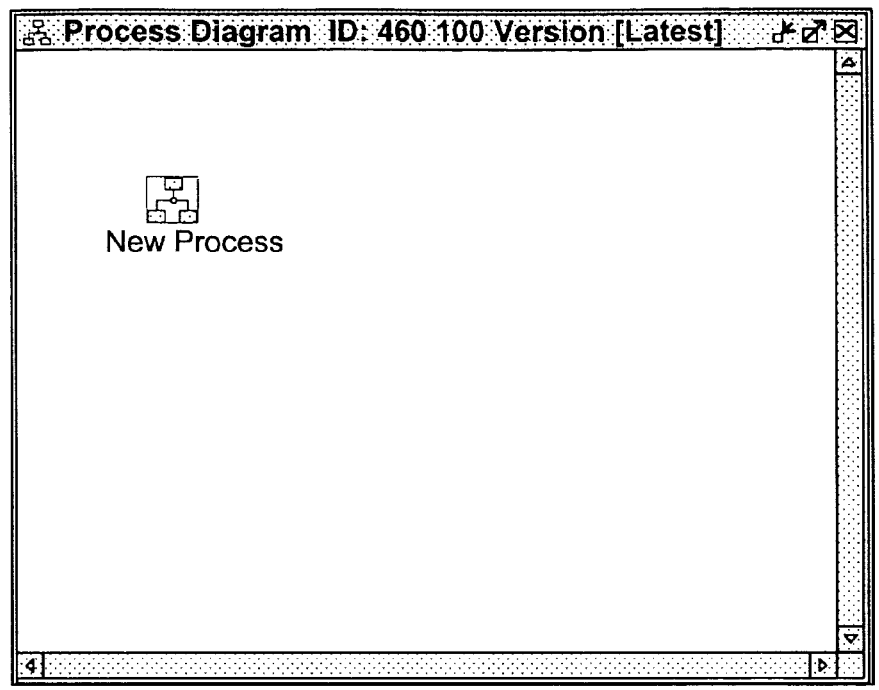
FIG. 17 is a screen shot of a new application node.

Step 3 Select a New Application to Build.
  1. Right-click on the category folder that was just created.
  A menu is displayed.
  2. Select New Application.
  A New Application node is displayed in the Application directory and in the Application Diagram. See FIG. 17.

Figure 18:
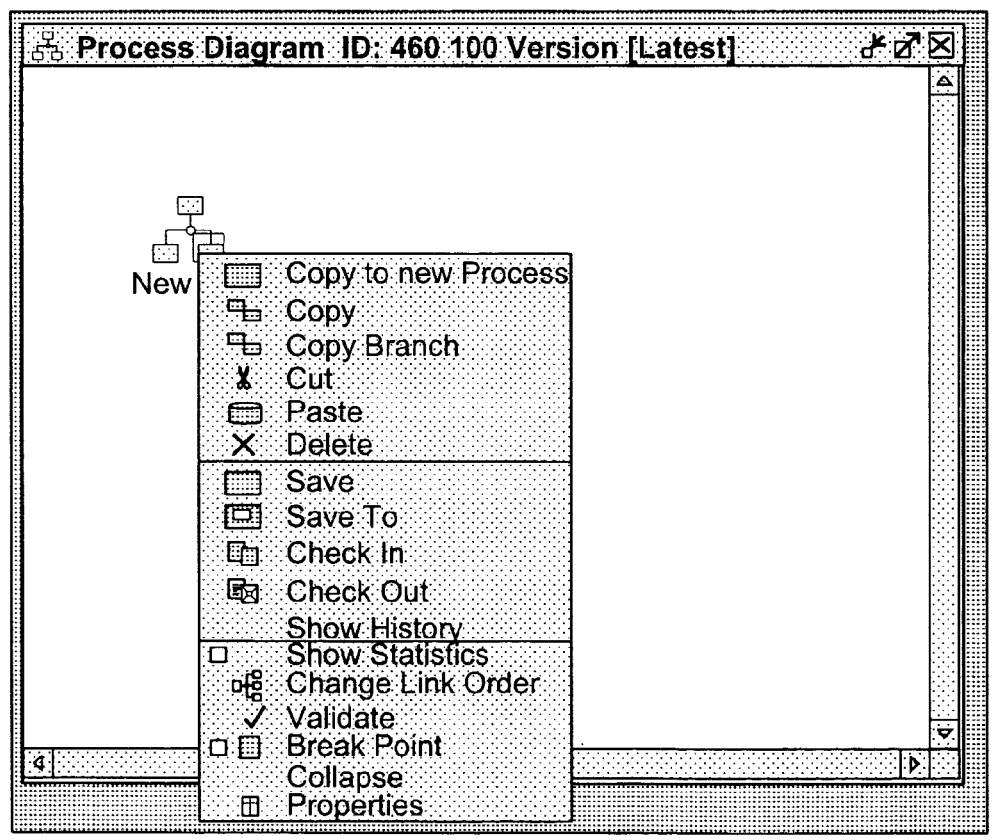
FIG. 18 is a screen shot of a menu display of the command options applicable to a selected node.

Step 4 Check Out the Application for Editing, if a Previously Created Application is Opened.
  1. Right-click on the Application node.
  A menu is displayed. See FIG. 18.
  2. Select Check Out.
  The application is now available for editing.
  Note: If the application will be unavailable for editing if another user has checked it out.

Figure 19:
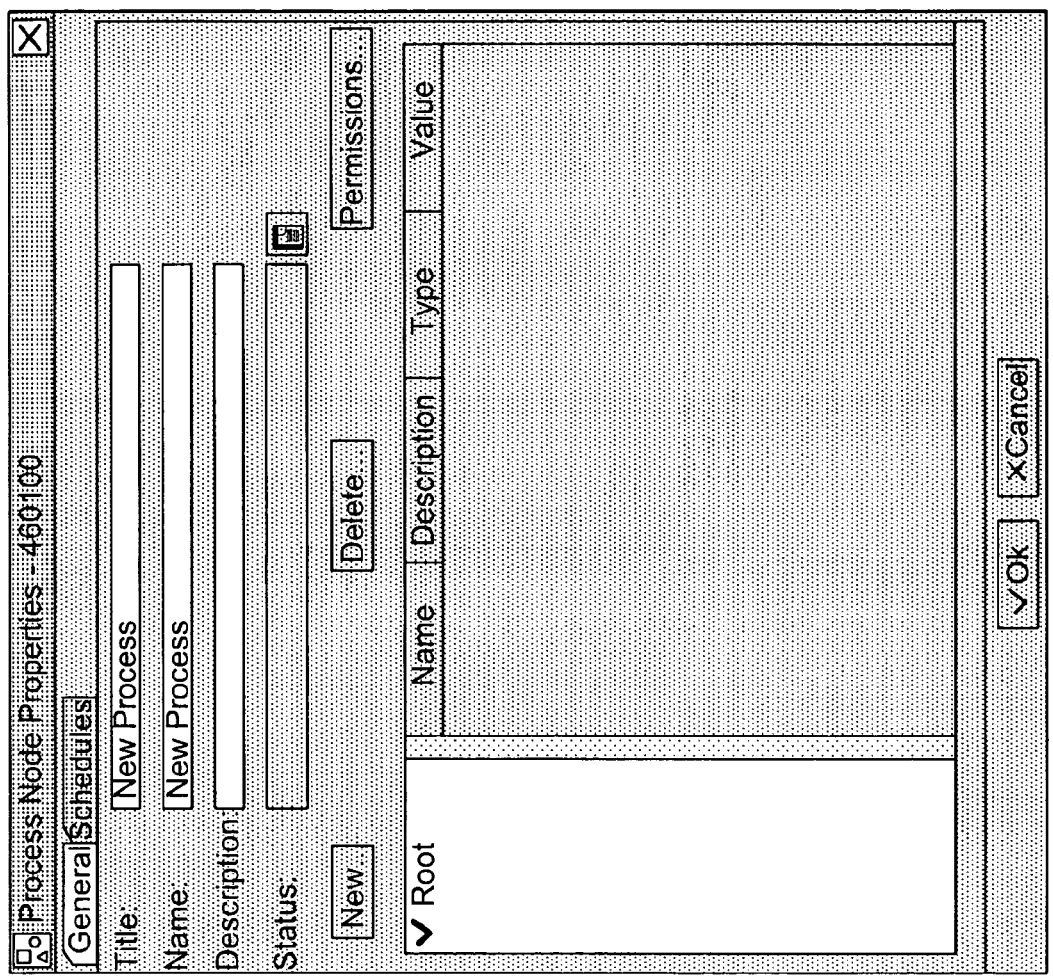
FIG. 19 is a screen shot of variables applicable to the selected node.

Step 5 Name the Application.
  1. Double-click on the Application node.
  The Application node's properties dialog box is displayed. See FIG. 19.
  2. Type a title and name for the new application.
  The title will label the icons in the Application directory and Application Diagram. The name is used for internal purposes and will not be displayed. The name must be entered alphanumerically and without any spaces.
  The sample title is Login Application, and the sample name is LoginApplication.
  3. Click OK.
  The properties dialog box is removed and the New Application title is updated in both the Application directory and Application Diagram areas.

Defining Variables

Variables are the base data handling mechanisms in a application. This section describes how to create variables through the Application node.

Step 1 Create Variables.
1. From the Application node's properties dialog box, click the New button.
A variable row is added to the variable list box.
2. Type a name for each variable.
In the sample, two variables are created: username and password.

Figure 20:
FIG. 20 is a screen shot illustrating variable attribute definitions for a selected variable of a node.
Figure 21:
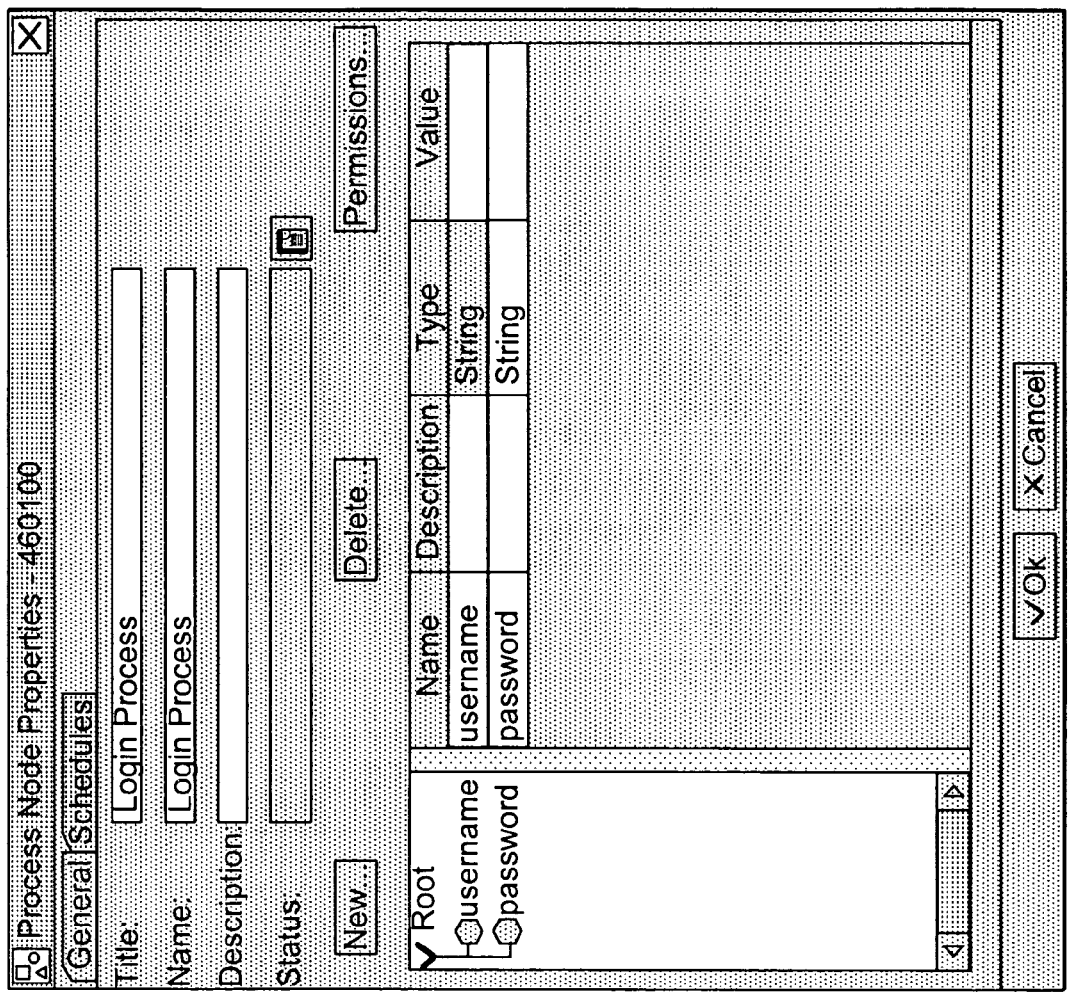
FIG. 21 is a screen shot that specifies the name of a variable.

Step 2 Select the Variable Type.
1. Click on the Type column box.
A list of variable types is displayed. See FIG. 20.
2. Scroll through the list and select a type.
Default values for the Variable type appear in the Value field. In the sample, username and password are String type variables, and the default value is an empty field. See FIG. 21.
3. Click OK.

Defining User Interaction

Figure 22:
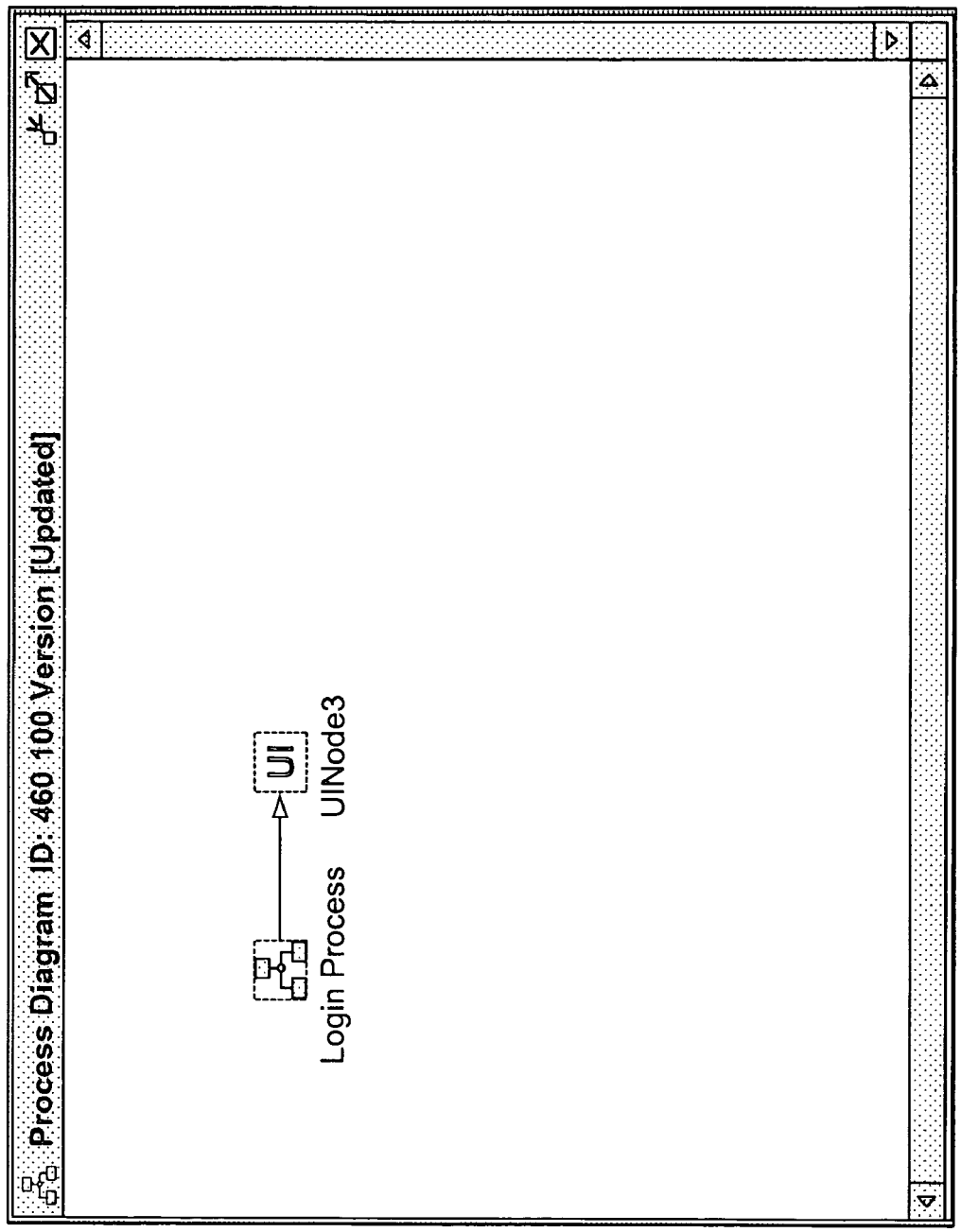
FIG. 22 is a screen shot of a user interface node.

Step 1 Add a User Interface Node.
1. Go to the Node Palette, if visible, or the selection of nodes displayed on the tool bar.
When the Node Palette is closed, the nodes are automatically displayed on the tool bar.
2. Add a User Interface Node to the Application Diagram.
Click on the User Interface node and drag it over the intended parent node. In the sample, the Application node, labeled Login Application, is the parent node. See FIG. 22.
3. Double-click on the User Interface node.
The User Interface node's properties dialog box is displayed.
4. Type a title and name for the new node.
The sample title is Login Screen, and the sample name is LoginScreen.
5. Click OK.

Figure 23:
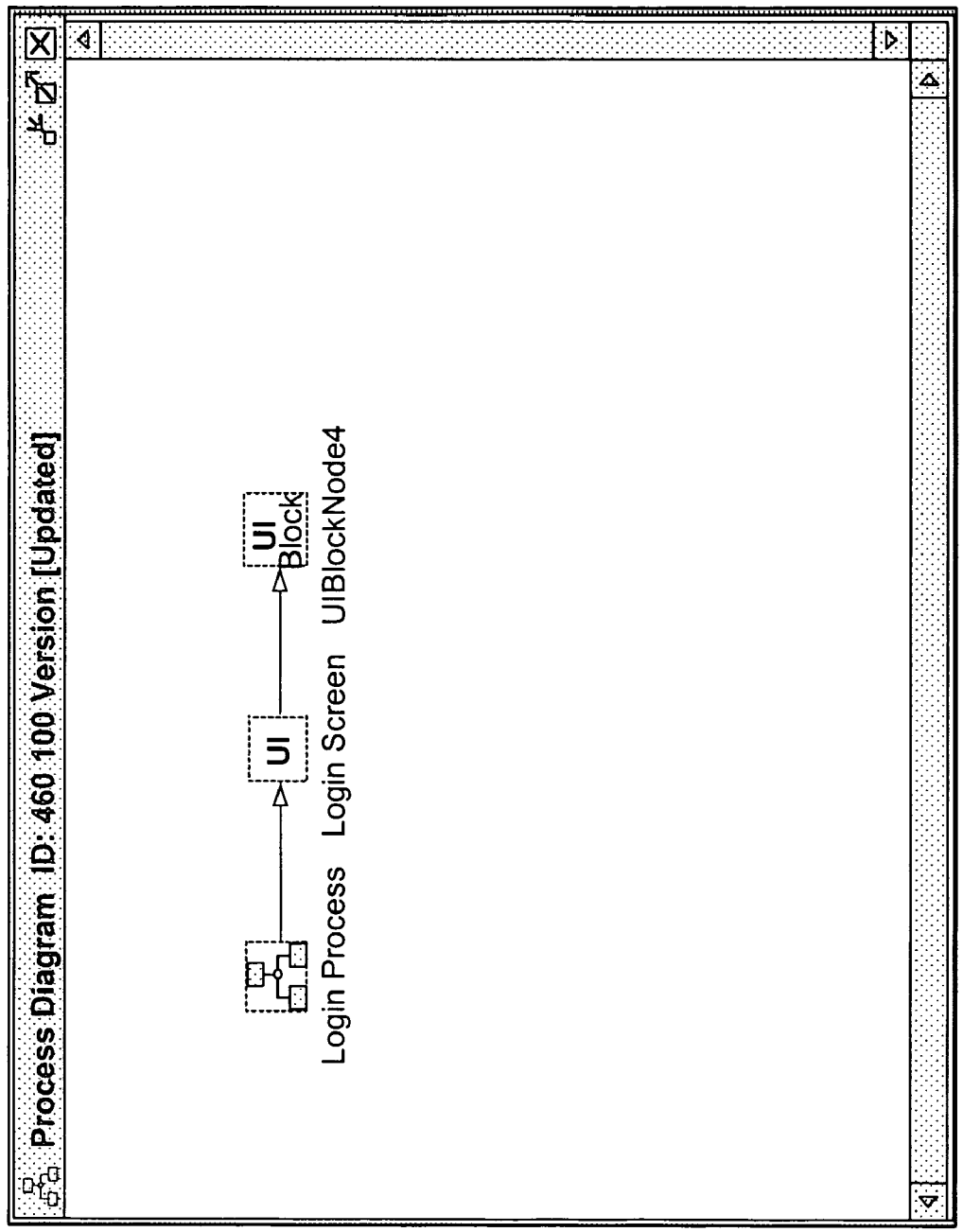
FIG. 23 is a screen shot of a user interface block node.

Step 2 Add a User Interface Block Node.
1. Go to the Node Palette, if visible, or the selection of nodes displayed on the tool bar.
2. Add a User Interface Block node to the Application Diagram.
Click on the User Interface Block node and drag it over the intended parent node. In the sample, the User Interface node, labeled Login Screen, is the parent node. See FIG. 23.
3. Double-click on the User Interface Block node.
The User Interface Block node's properties dialog box is displayed.
4. Type a title and name for the new node.
The sample title is Login Controls, and the sample name is LoginControls.
5. Click OK.

Figure 24:
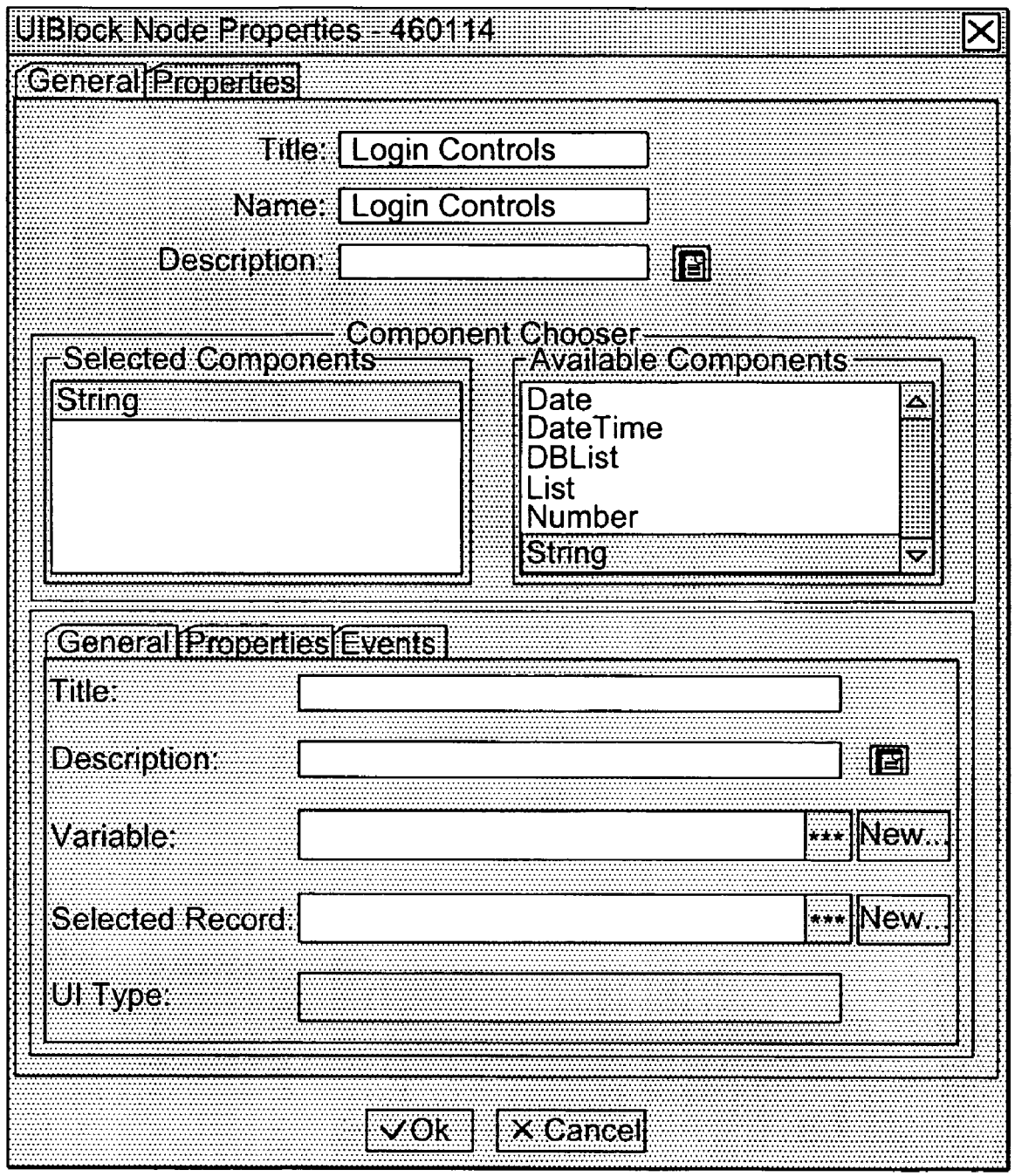
FIG. 24 is a screen shot that illustrates user interface block node properties.

Step 3 Select a Component.
1. Double-click on the User Interface Block node.
The User Interface Block node's properties dialog box is displayed.
2. Double-click on a component type in the Available Components list.
The Component definition box is displayed with tabs labeled General, Properties, and Events.
For the sample case, a String type component is selected. See FIG. 24.

Figure 25:
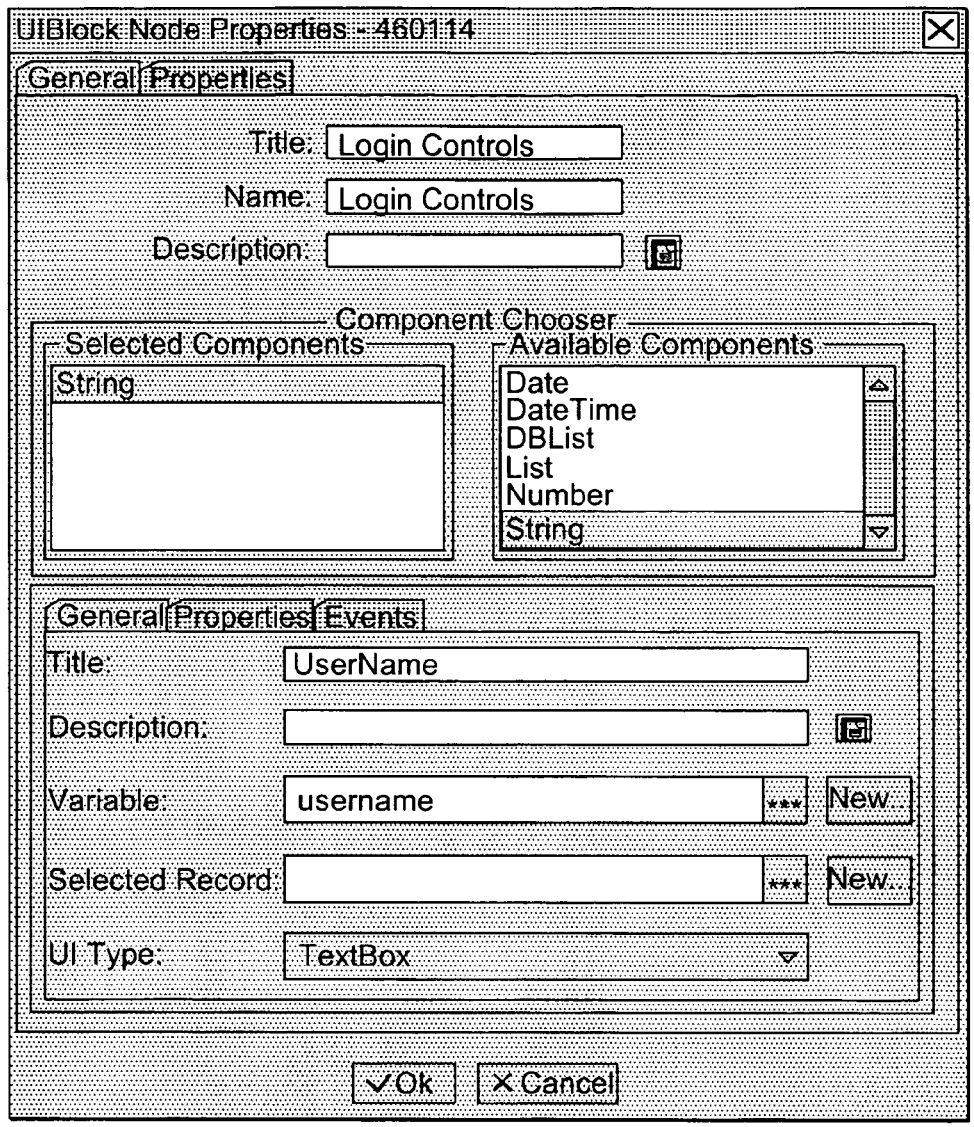
FIG. 25 is a screen shot of a component definition box.
Figure 26:
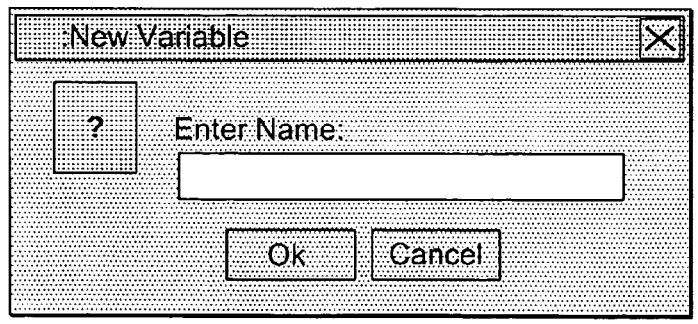
FIG. 26 is a screen shot of a variable definition box for a user interface block node.
Figure 27:
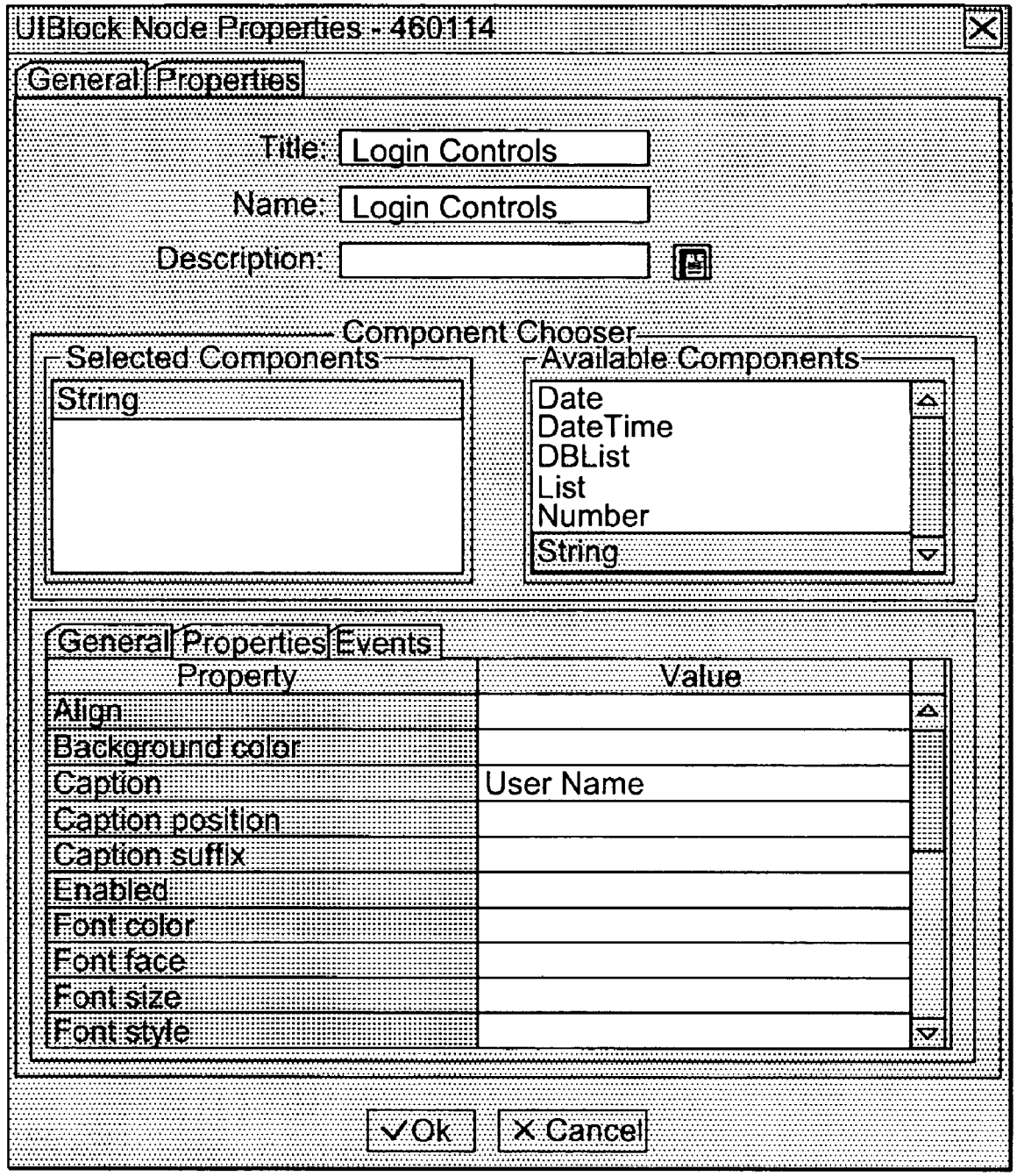
FIG. 27 is a screen shot of a component definition box with a properties tab.

Step 4 Define the Component.
1. Type a title for the component.
The Title field is in the General tab of the Component definition box.
For the sample case the component label, UserName, is used.
2. Map a variable to the component.
Click on the drop down list in the Variable field.
This displays a list of defined variables that match the component type.
For the sample case, the username variable is selected. See FIG. 25.
3. Define additional variables as needed.
a. Click the New button on the General tab.
The Variable definition box is displayed. See FIG. 26.
b. Enter the variable Name.
The variable's type will be the same as the component's type.
For the example, the type is String.
4. Select a User Interface type for the component.
a. Click on the drop down list in the UI Type field.
A list of options is displayed.
b. Choose one of the UI Type options.
In the sample case, TextBox is chosen. See FIG. 25 above.
5. Define properties for the component.
a. Click on the Properties tab.
A list of properties is displayed in the left column, and a blank list of values appears in the right column.
b. Type in property values, or click on a drop down list and choose a property value.
When typing property values, make sure to press enter or the value will not be displayed.
For the sample case, (see FIG. 27), the following values are set:
caption—User Name. This is the caption for the text box created by the username variable.
help text—Please enter a user id and password. This message will be displayed when the cursor is positioned over the User Name text box.
Note: For the sample case, a second component is created. Follow Steps 4 and 5 above to create another string component named Password. Map the component to the password variable. Select the TextBox UI type. Finally, set the properties: Password is entered as the caption property, and True is chosen for the password property.

Figure 28:
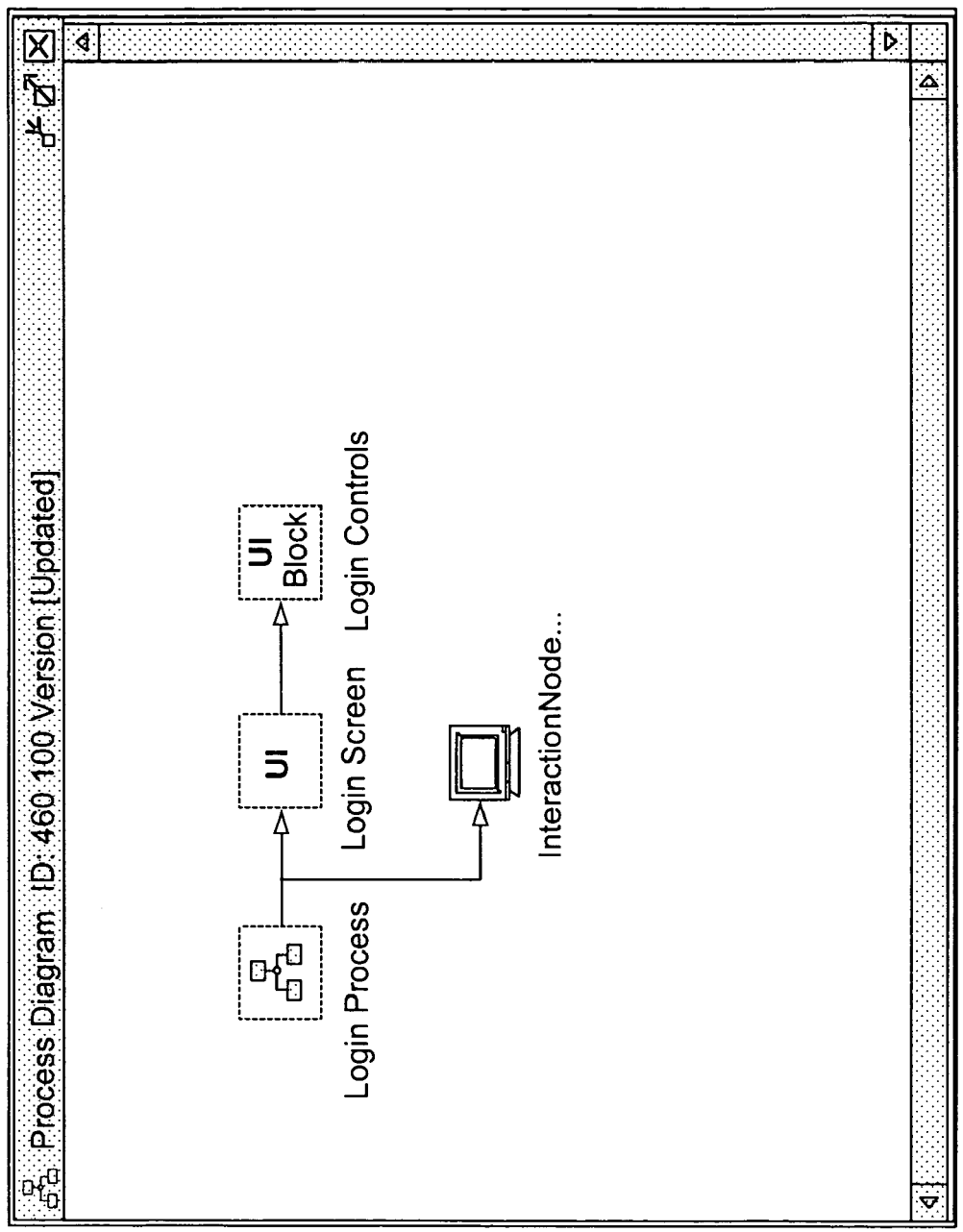
FIG. 28 is a screen shot of an interaction node.

Step 5 Add an Interaction Node.
1. Go to the Node Palette, if visible, or the selection of nodes displayed on the tool bar.
2. Add an Interaction node to the Application Diagram.
Click on the Interaction node and drag it over the intended parent node. In the sample, the Application node, labeled Login Application, is the parent node. See FIG. 28.
3. Double-click on the Interaction node.
The Interaction node's properties dialog box is displayed.
4. Type a title and name for the new node.
The sample title is Login Interaction, and the sample name is LoginInteraction.
5. Click OK.

Figure 29:
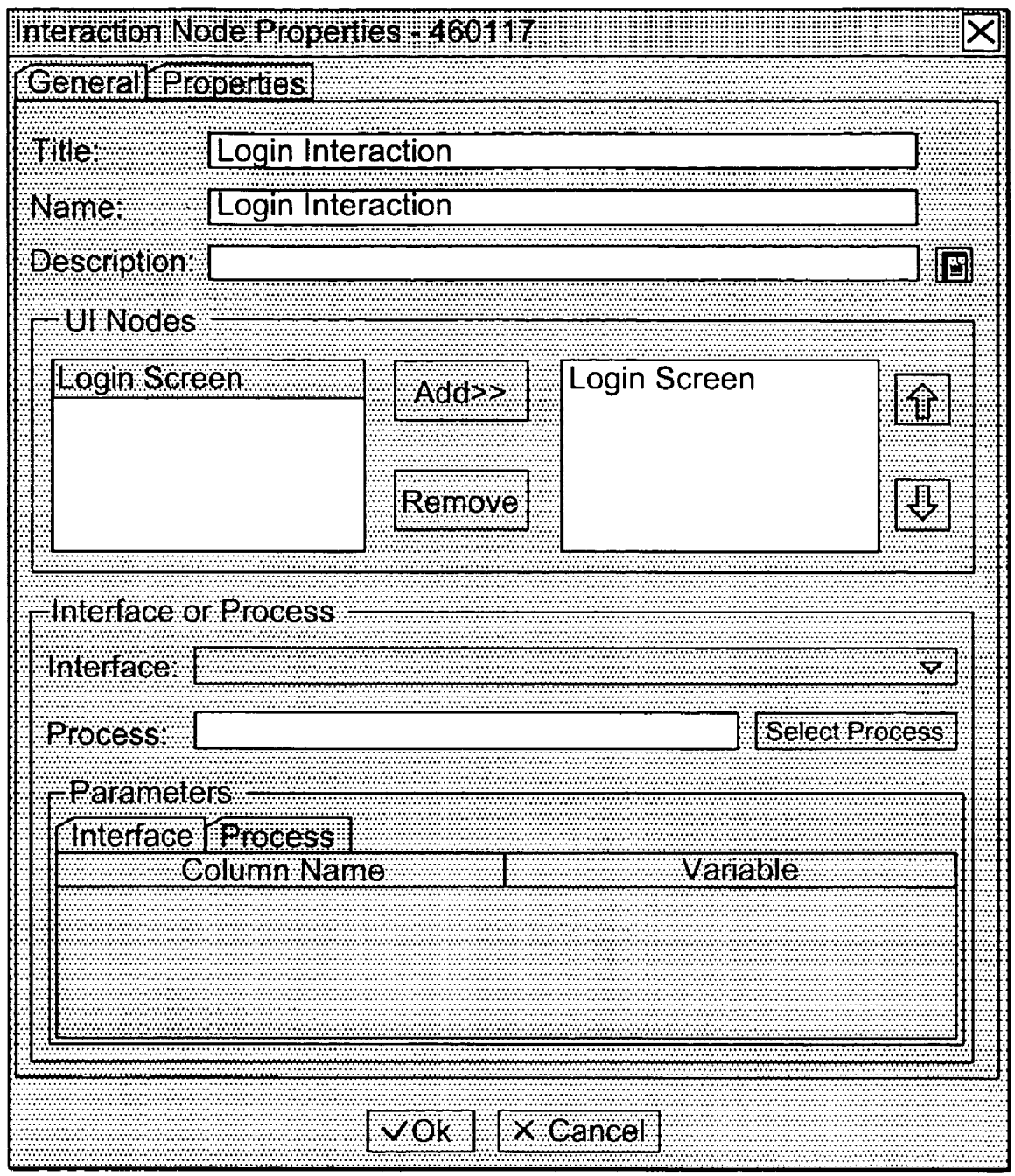
FIG. 29 is a screen shot of the properties of an interaction node.

Step 6 Map a User Interface Node to the Interaction Node.
1. Double-click on the Interaction node.
The Interaction node's properties dialog box is displayed.
2. Select from the list of User Interface nodes.
In the sample, the User Interface node titled Login Screen is selected. See FIG. 29.
3. Click Add.
The selected User Interface node will appear in the right column.

Figure 30:
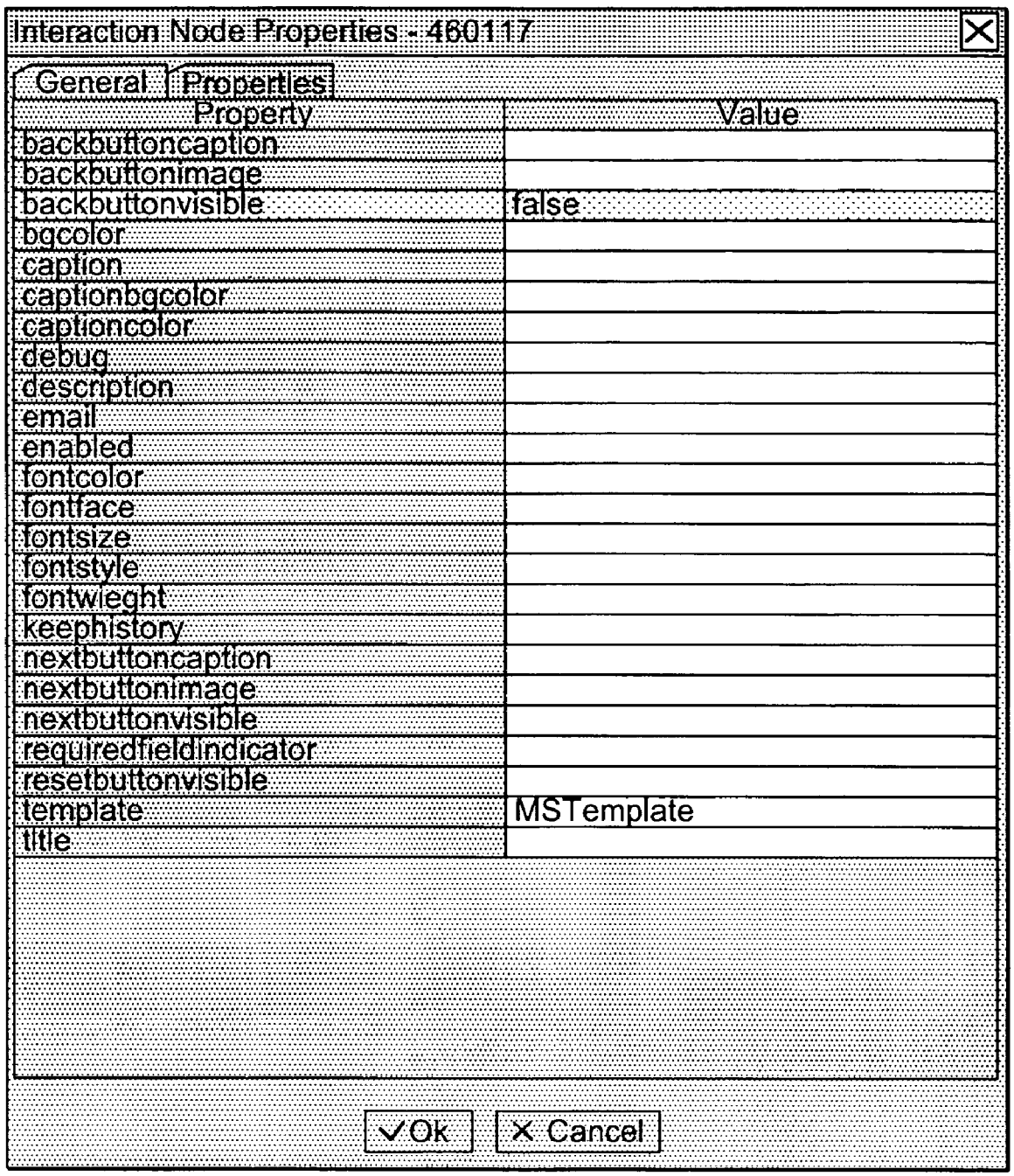
FIG. 30 is a screen shot illustrating an interaction node properties.

Step 7 Define the Interaction node's properties.
 1. Click on the Properties tab.
 A list of properties will be displayed in the left column, while a blank list of values will appear in the right column.
 2. Type in property values, or click on a drop down list and choose a property value.
 When typing property values, make sure to press enter or the value will not be displayed.
 For the sample case, (see FIG. 30), the following values are set:
  backbuttonvisible—false. This will prevent the back button from being displayed.
  template—MSTemplate. This will display the MS Template.
 3. Click OK
 The Interaction node's properties are now set.

Figure 31:
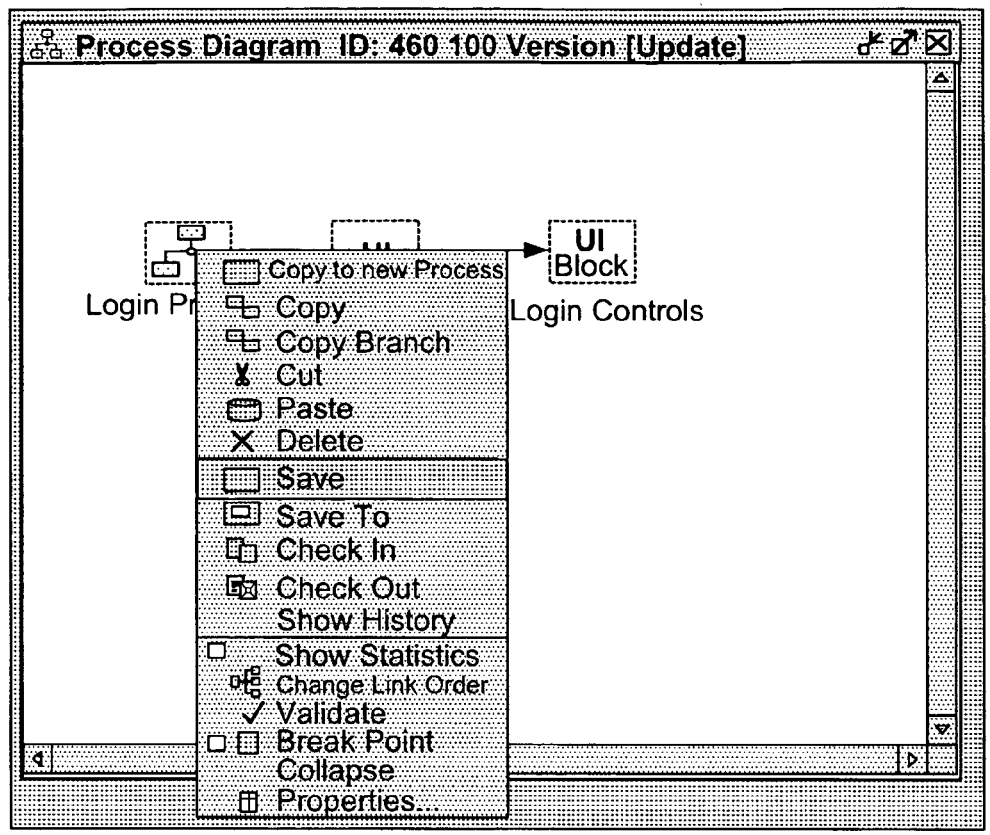
FIG. 31 is a screen shot of an application node menu to save a process.
Figure 32:
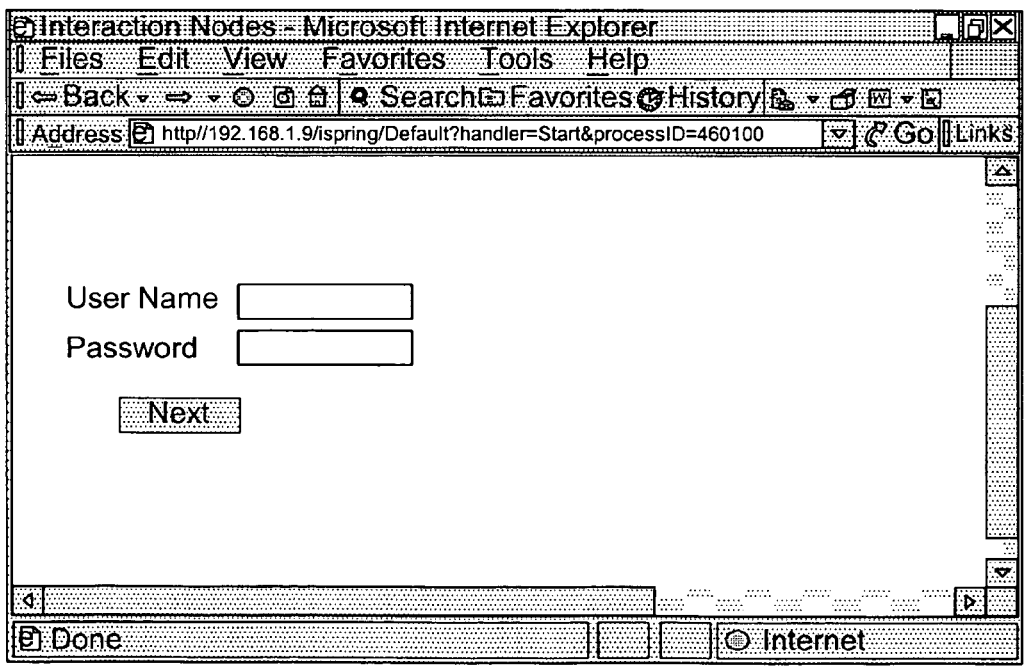
FIG. 32 is a screen shot of a log-in function URL with basic fields.

Step 8 Verify the Component Display on the Website.
 1. Save the application.
 a. Right-click on the Application node.
 For the sample case, the Application node is labeled Login application.
 The Application node menu is displayed. See FIG. 31.
 b. Select Save.
 2. Find the Application node's ID.
 Write down the ID that is displayed in the title of the Application Diagram.
 3. Open a web browser.
 4. Determine the Intranet path to the Application URL.
 A URL example is:
 http://192.168.1.9/ispring/
  Default?handler=Start&applicationID=460100
 5. Specify the application ID number found in SubStep 2b as the last six digits of the URL.
 The application created thus far is displayed.
 For the sample case, the two fields, User ID and Password, are displayed. See FIG. 32.
 6. Once application the application, return to the Application Builder.

Defining the Database Information Used to Verify a Login

All records related to the login application are stored in a database. To access the information in the database, a selection is made from pre-defined database interfaces created for a login in the Interface Manager. The following steps describe how to define what database information will be compared to the user login information.

Figure 33:
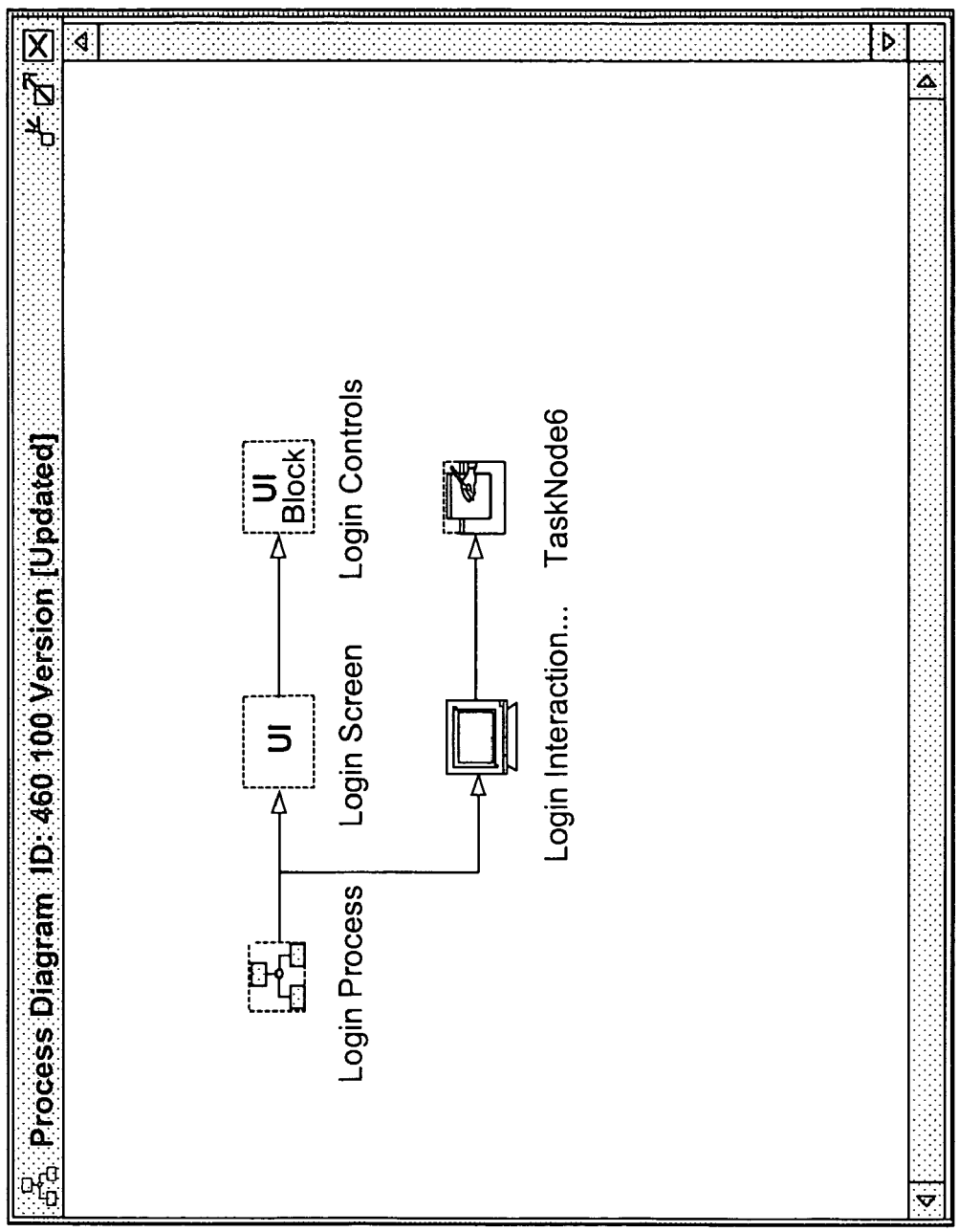
FIG. 33 is a screen shot of an example of a task node.

Step 1 Add a Task Node.
 1. Go to the Node Palette, if visible, or the selection of nodes displayed on the tool bar.
 2. Add a Task Node to the Application Diagram.
 Click on the Task node and drag it over the intended parent node. In the sample, the Interaction node, labeled Login Interaction, is the parent node. See FIG. 33.
 3. Double-click on the Task node.
 The Task node's properties dialog box is displayed.
 4. Type a title and name for the new node.
 The sample title is Verify Login, and the sample name is VerifyLogin
 5. Click OK.

Figure 34:
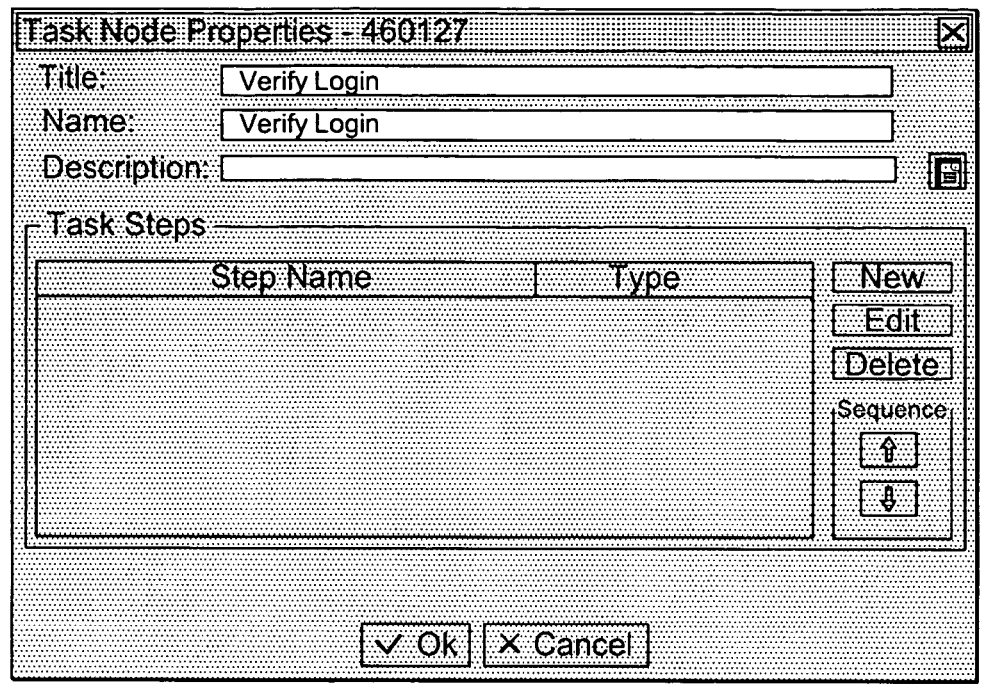
FIG. 34 is a screen shot of a task node properties.
Figure 35:
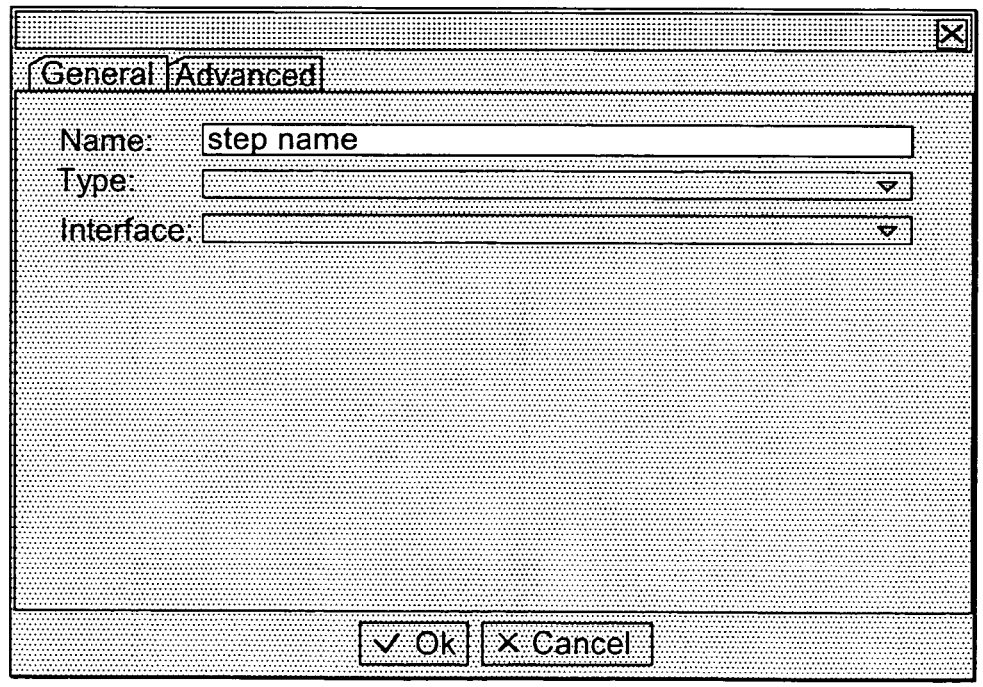
FIG. 35 is a screen shot of a step definition box.

Step 2 Add a Step to the Task Node.
 1. Display the Task node's properties dialog box.
 Double-click on the Task node.
 The Task node's properties dialog box is displayed. See FIG. 34.
 2. Add a step.
 A Task node can have as many steps as needed. The steps are applicationed in top down order.
  Click New button.
  The new step's definition box is displayed. See FIG. 35.

Figure 36:
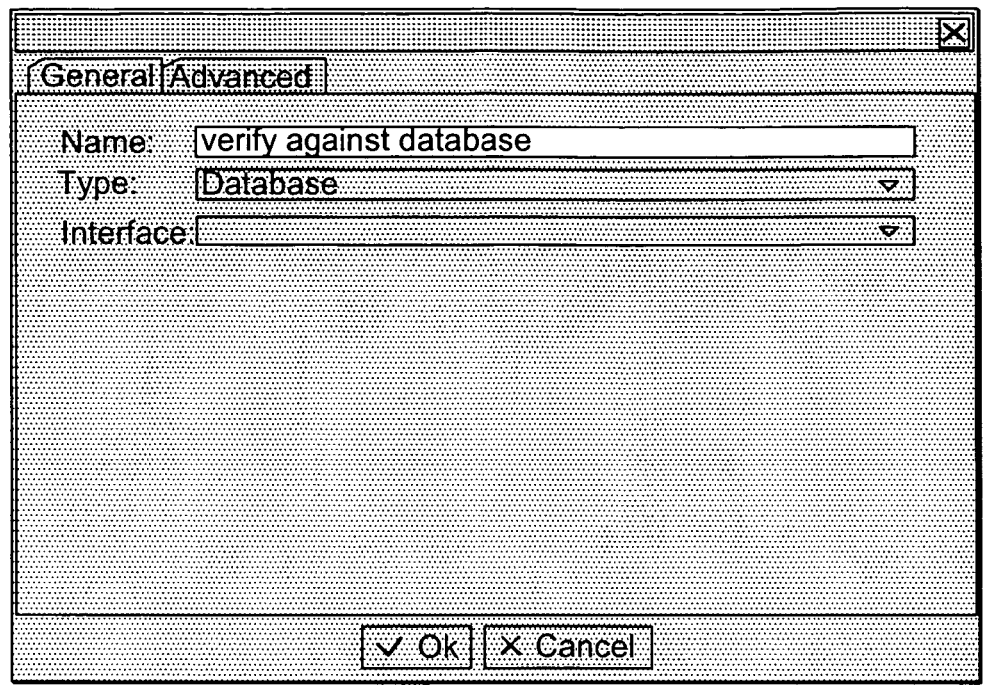
FIG. 36 is a screen shot for selecting a step function.

Step 3 Define the Function of the Step.
 1. Specify a name for the step.
 Type a name in the Name field.
 For the sample case, Verify against database is used.
 2. Select a function for the step.
 Click on the Type drop down list and select from one of the choices.
 For the sample case, Database is selected. See FIG. 36.
 3. Select an interface.
 Click on the Interface drop down list and select from one of the choices.
 For the sample case, MS Verify Login is selected.
 Once an interface is selected, the Interface area will appear.

Figure 37:
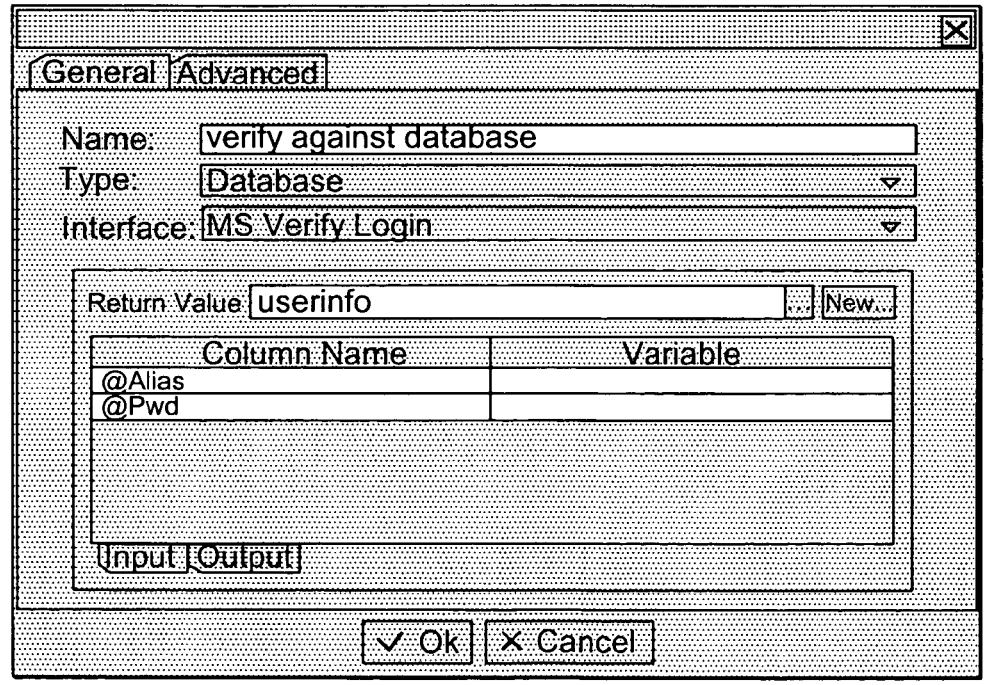
FIG. 37 is a screen shot illustrating database variable interface options.
Figure 38:
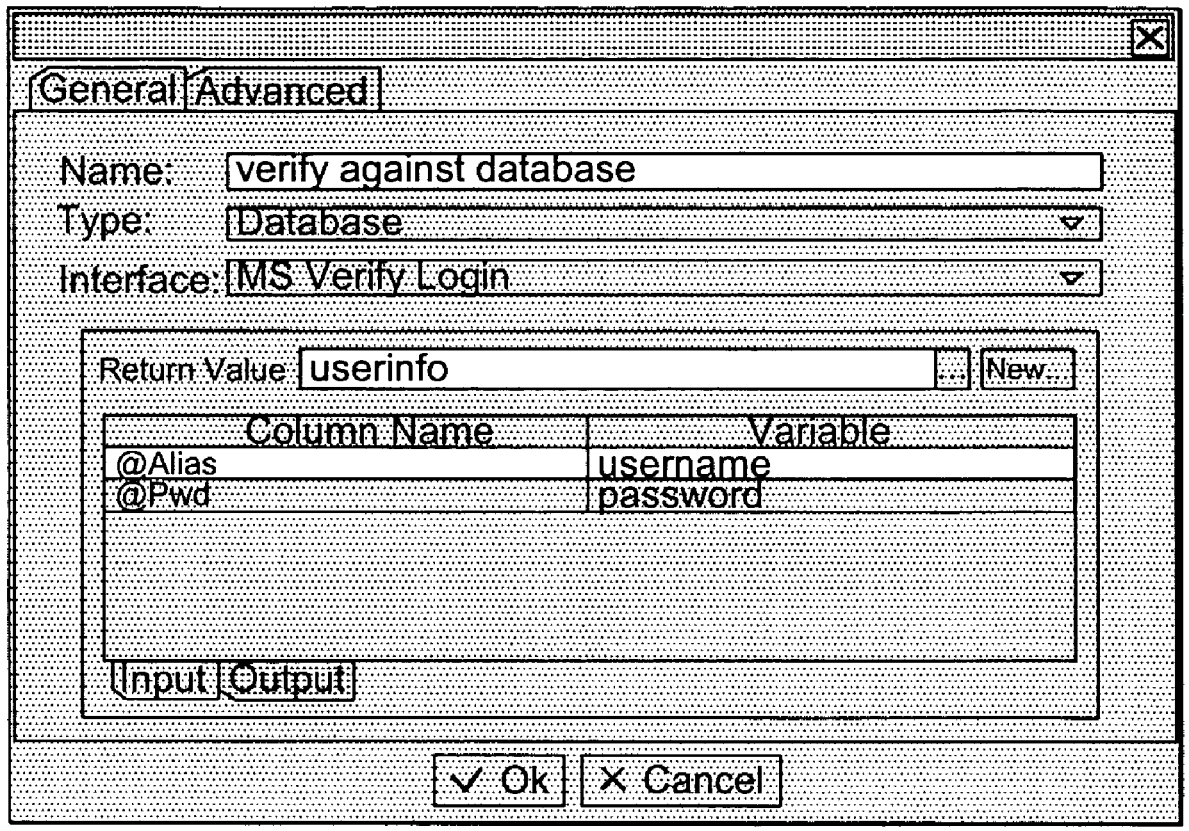
FIG. 38 is a screen shot illustrating mapping of database parameters.

Step 4 Create a DB List Variable.
 1. In the Interface area, click the New button.
 A New Variable box is displayed.
 2. Type a name for the new DB List variable.
 For the sample case, the variable name is userinfo.
 This name is displayed in the Return Value field. See FIG. 37.
 3. Select a Return Value from the drop down list.
 The Return Value is the predefined information that is returned from the database.
 4. Enter Input and Output parameters, as needed.
 The database interface set in the Interface field has it's own set of Input and Output requirements. These map to specific columns in the database records.
  a. Click on the Variable field for each Input and Output Column Name.
  A list of variables of matching type is displayed.
  b. Scroll through the list and select a variable.
   For the sample, the @Alias column name is mapped to the username variable, and @Pwd is mapped to the password variable. See FIG. 38.

Setting Up for a Message Response

For an iterative response with the user it is necessary to define additional variables and components that can be used as temporary containers for the iterative actions.
 For the sample case, the following items must be created:
 Variable—blank, String type.
 Component—UserNotFound, String type.
 To create the variable, follow steps 1 and 2 under the Defining Variables section above.
 To create the component, follow steps 4, 5, and 6 in the Defining User Interaction section above. When defining fields in the Component box, General tab, select blank as the variable, and Label as the UI Type. Do not set property values for the component yet. Those will be set later in the Data node.

Setting Up a Condition

A decision node is used if it is desired for the application to proceed along a certain path only if selected conditions are met. Decision nodes are used to test for specific if/then conditions.

Figure 39:
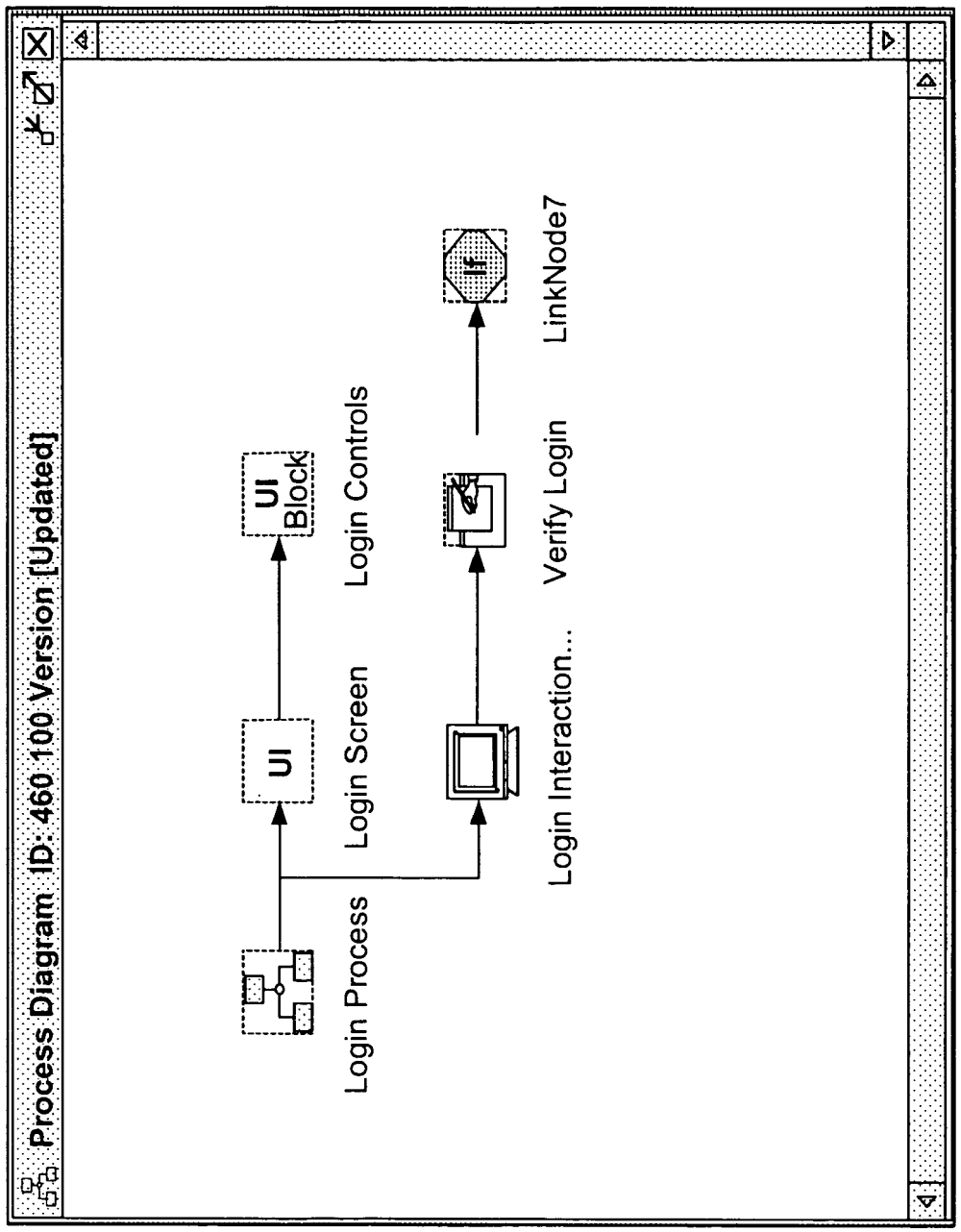
FIG. 39 is a screen shot of a decision node.

Step 1 Add a Decision Node.
 1. Go to the Node Palette, if visible, or the selection of nodes displayed on the tool bar.
 2. Add a Decision node to the Application Diagram.
  Click on the Decision node and drag it over the intended parent node. In the sample, the Task node, labeled Verify Login, is the parent node. See FIG. 39.
 3. Double-click on the Decision node.
  The Decision node's properties dialog box is displayed.
 4. Type a title and name for the new node.
  The sample title is Invalid User, and the sample name is InvalidUser.
 5. Click OK.

Figure 40:
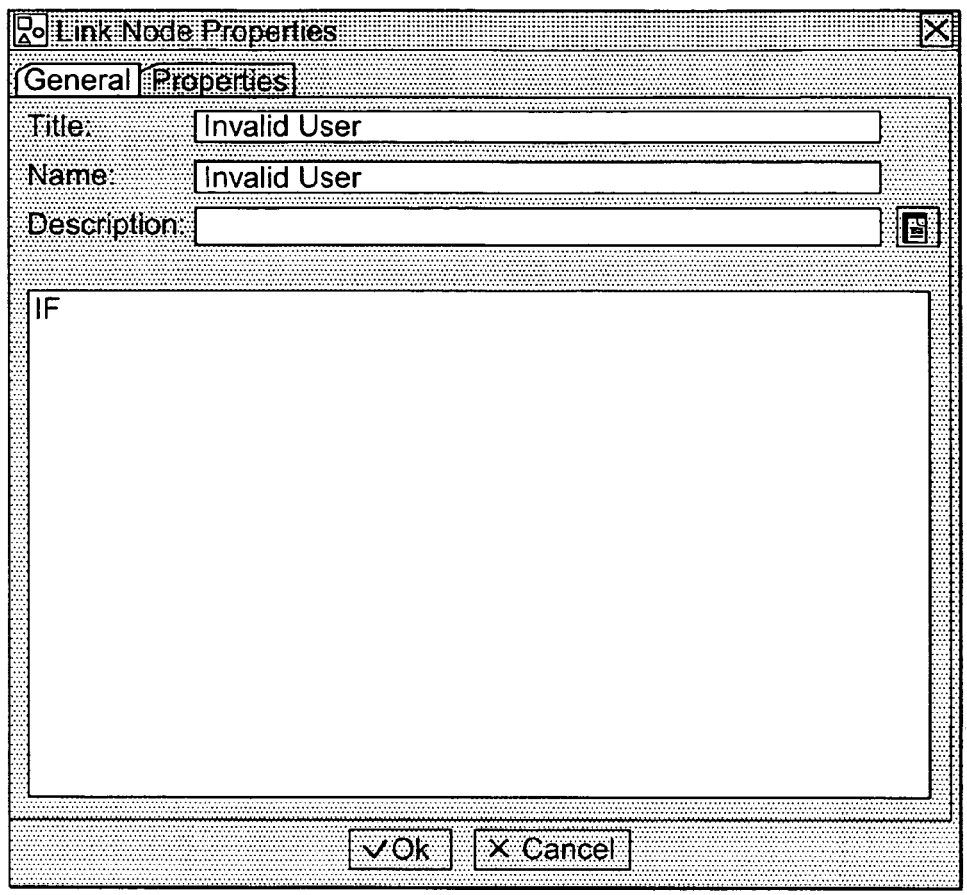
FIG. 40 is a screen shot of a dialog box for a decision node properties.
Figure 41:
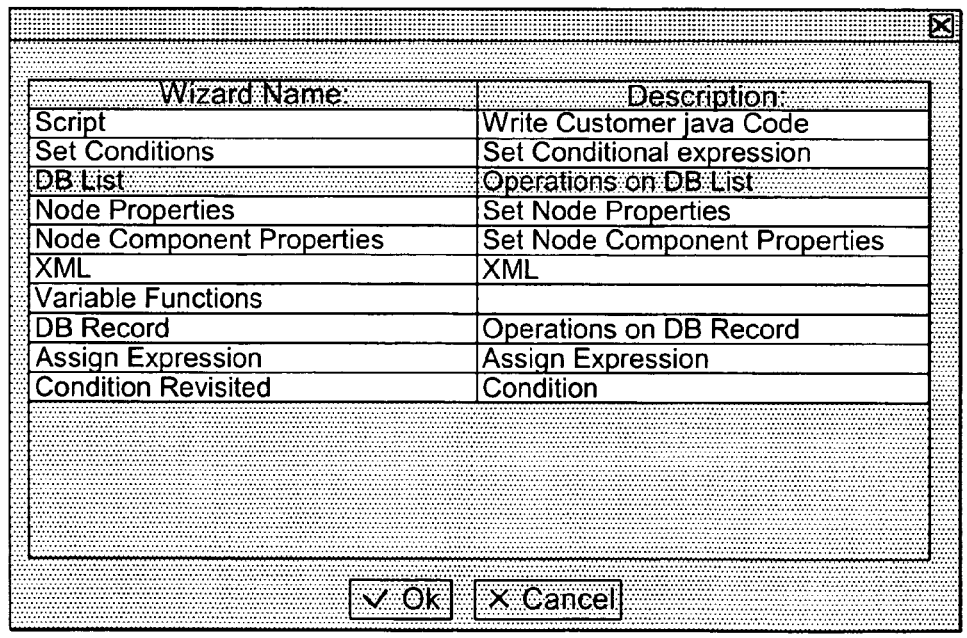
FIG. 41 is a screen shot of a list of functions available at a decision node.
Figure 42:
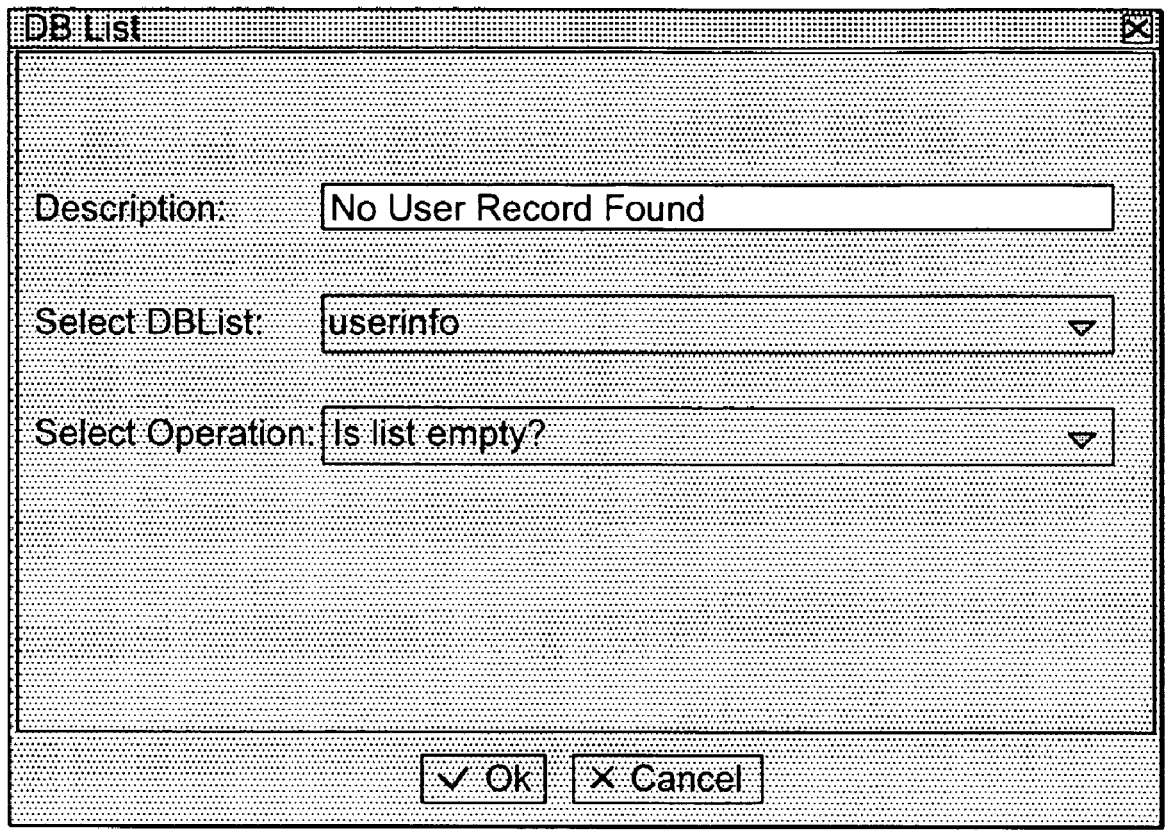
FIG. 42 is a screen shot of one of the functions of a DB list function.

Step 2 Define the Decision Node Conditions.
 1. Open the Decision node's properties dialog box.
  Double-click on the Decision node in the Application Diagram.
  The Decision node's properties dialog box is displayed. See FIG. 40.
 2. Right-click on the IF in the large text box.
  A menu will appear with the options New and Expand Tree. elect New.
  A Wizard box with a list of options is displayed. See FIG. 41.
 3. Select one of the listed options.
  For the sample case, DBList is selected.
  The DBList's properties dialog box will appear. See FIG. 42.
 4. Enter a Description.
  In the Description field, type a description of the condition.
  For the sample case, No User Record Found is entered.
 5. Select a DBList variable.
  Under the click arrow in the Select DBList field is a list of variables that were created through the Task node.
  Select one of the variables.
  For the sample case, userinfo is selected.
 6. Select an Operation.
  Under the drop down list in the Select Operation field is a list of possible operations.
  Select one of the Operations.
  For the sample case, Is list empty? is selected.
 7. Click OK
  The conditions will appear in the Decision node's properties dialog box.
  Once the condition is defined, the Data node is used to build expressions.

Figure 43:
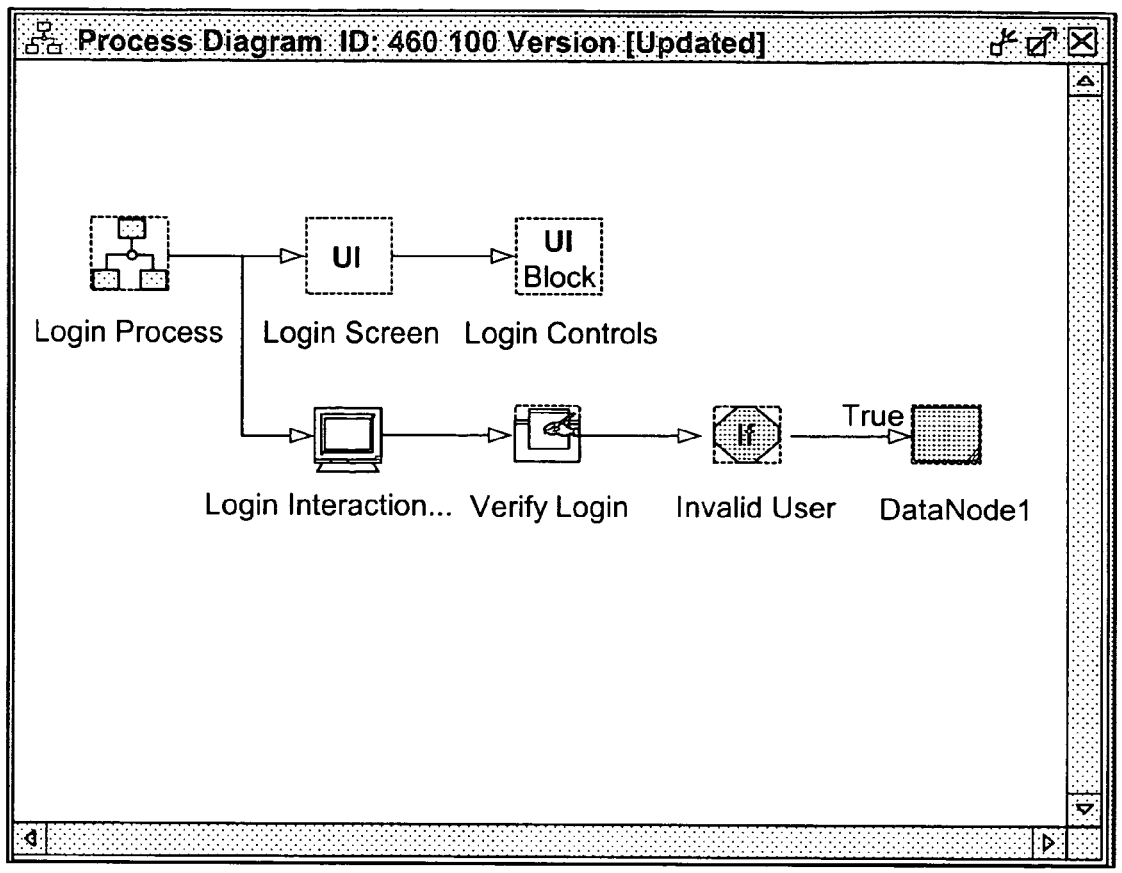
FIG. 43 is a screen shot of a data node.

Step 1 Add a Data Node.
 1. Go to the Node Palette, if visible, or the selection of nodes displayed on the tool bar.
 2. Add a Data node to the Application Diagram.
  Click on the Data node and drag it over the intended parent node. In the sample, the Decision node, labeled Invalid User, is the parent node. See FIG. 43.
 3. Double-click on the Data node.
  The Data node's properties dialog box is displayed.
 4. Type a title and name for the new node.
  The sample title is Show Error Message, and the sample name is ShowErrorMessage.
 5. Click OK.

Figure 44:
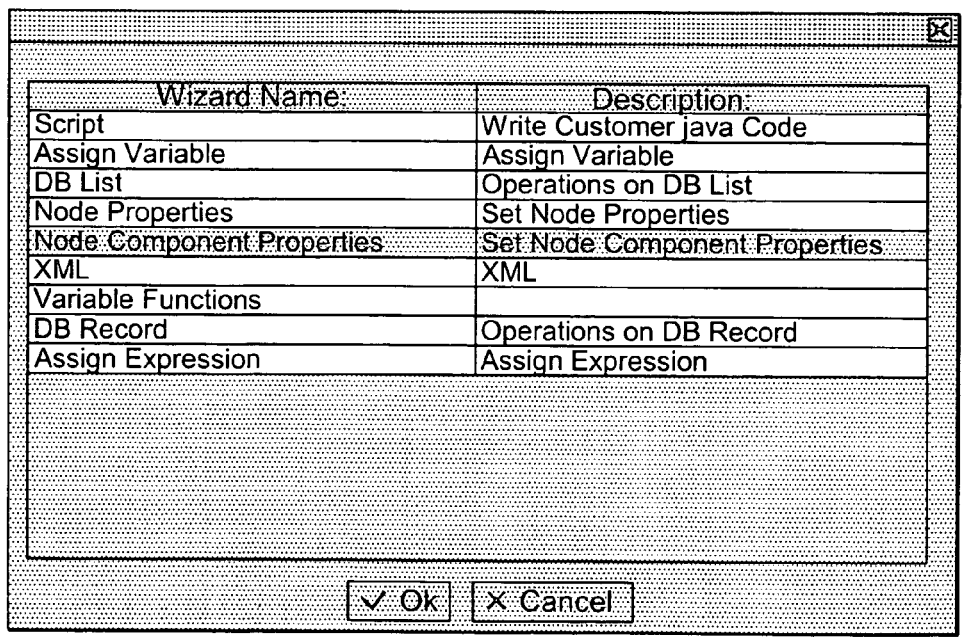
FIG. 44 is a screen shot of a list of functions available at a data node.
Figure 45:
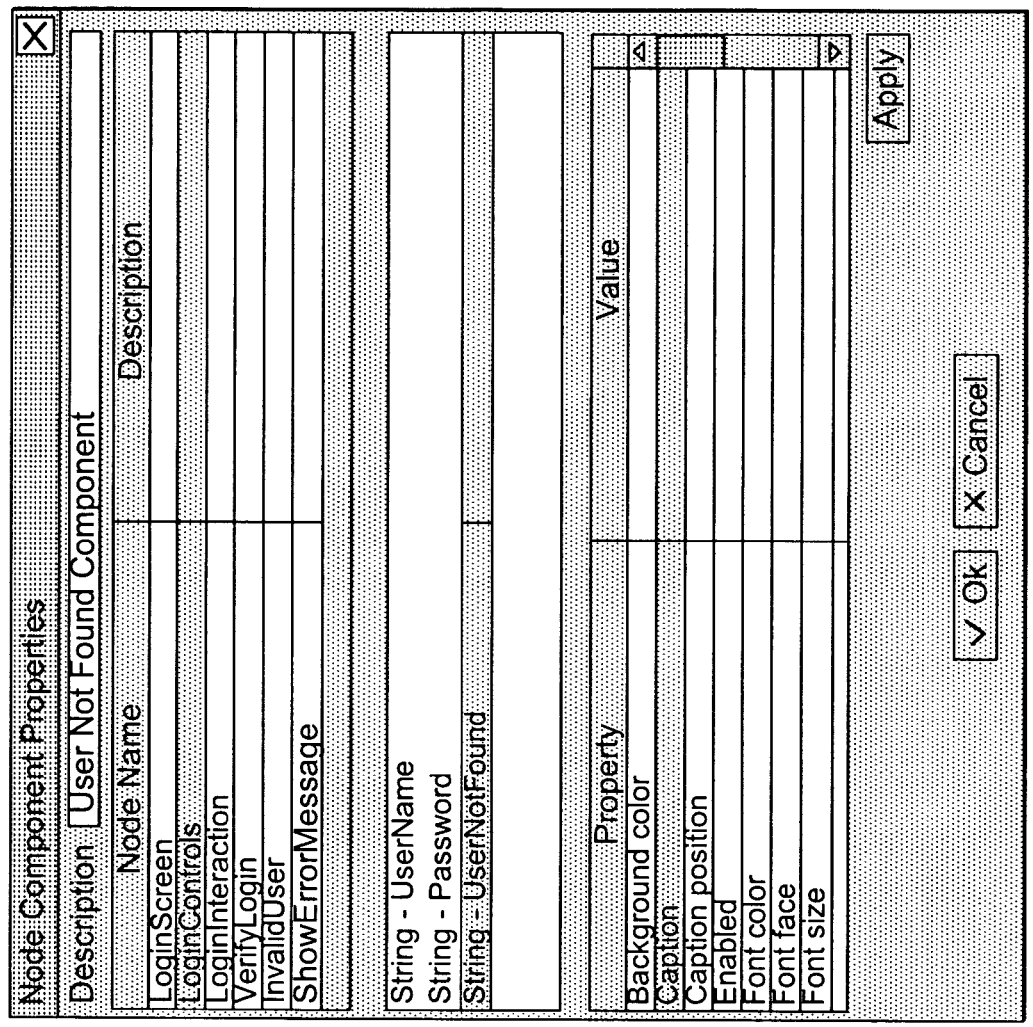
FIG. 45 is a screen shot illustrating node component function.

Step 2 Define the Data Node.
 1. Open the Data node's properties dialog box.
  Double-click on the Data node in the Application Diagram.
  The Data node's properties dialog box is displayed.
 2. Create Rules for the Data node.
 b. Click New in the Rules Definition box.
  The Wizard box is displayed. See FIG. 44.
 c. Select a Wizard.
  Click on the appropriate Wizard and click OK.
  For the Sample case, Node Components Properties is selected.
 d. The Node Components Properties dialog box is displayed. See FIG. 45.
 3. Enter a description.
  In the Description field, type an appropriate description for the rule.
  For the sample case, User Not Found Component is entered as the description.

Step 3 Map the Component to the Data Node.
 1. Map the rule to the User Interface Block node
  Click on a User Interface Block node in the Node Name field.
 2. Select a component.
  Click on a component name.
  For the sample case, String-UserNotFound is selected.
 3. Define the properties of the component.
 a. Enter text for the Caption property.
  For the sample case, Incorrect User Name or Password is entered.
 b. Select a value for the Visible property.
  For the sample case, true is selected from the drop down list.
 c. Click Apply.
  The component property values are set.
 d. Click OK.
  returned to the Data node's properties dialog box.
 4. Check the new rule.
  In the Data node's properties dialog box, click Check.
  This verifies that the rule has been defined correctly.

Defining a Loop

Loops are a series of repeated steps. The beginning of a loop is specified as the last node a application runs before returning to an earlier part of the application. The point where it is desired for the application to return is the node that will have the loop node as its parent node.

Figure 46:
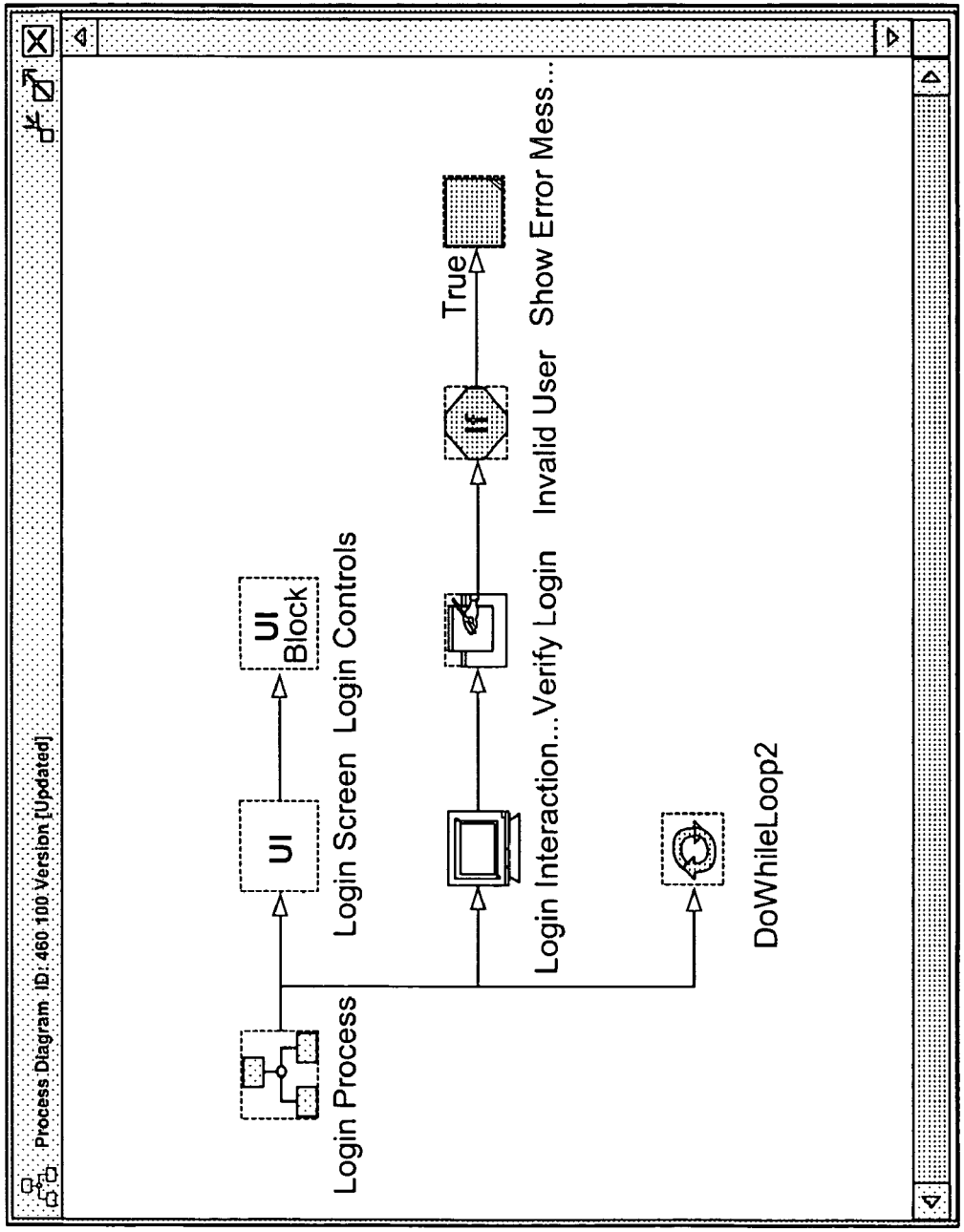
FIG. 46 is a screen shot of a do while loop node.
Figure 47:
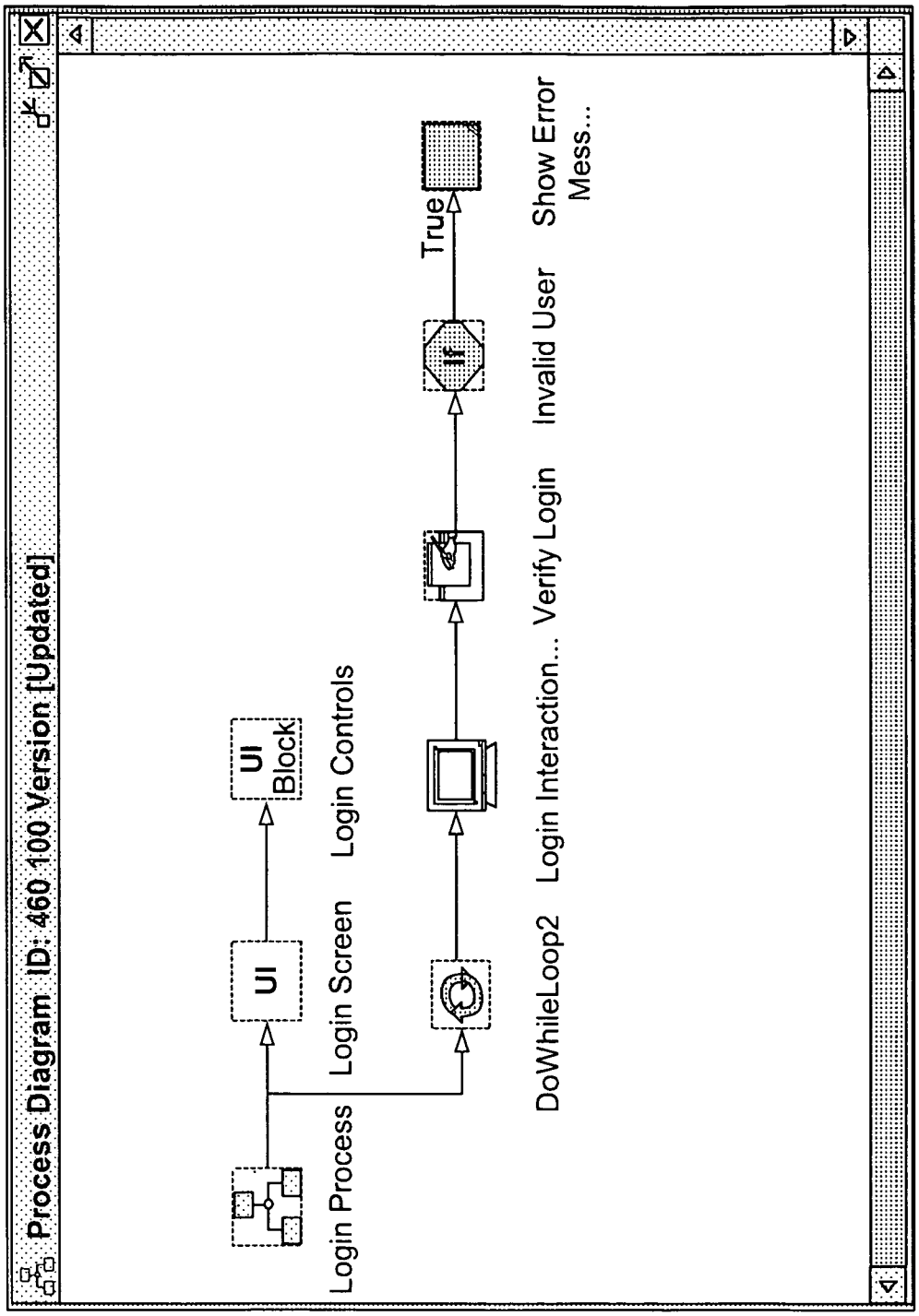
FIG. 47 is a screen shot of a loop application process.

Step 1 Add a Loop Node.
 1. Select a type of Loop node.
  There are two types of loop nodes: While and Do While. For applications that require that the condition be checked before the loop begins, choose the While Loop. If it is desired that the condition is not checked until after the first loop, choose the Do While Loop.
  For the sample case, the Do While Loop is selected.
 2. Go to the Node Palette, if visible, or the selection of nodes displayed on the tool bar.
 3. Add a Do While Loop node to the Application Diagram.
 a. Drag the Do While Loop node over the intended parent node. In the sample, the Application node, labeled Login Application, is the parent node.
  The Do While Loop node will appear on a lower branch. See FIG. 46.
 b. Move the branch that will place the nodes in the loop application into the position of the Do While Loop node's children.
 i. Copy the branch.
  Right-click on the node to be placed immediately after the Do While Loop node and select Copy Branch.
  For the sample case, the branch is copied from the Interaction node.

ii. Paste the branch.
Right-click on the Do While Loop node and select Paste.
The copied branch will appear.
iii. Remove the old branch.
Right-click on the node copied the branch from and select Delete. When the query is posed to delete the node and all of its children. Select OK.
For the sample case, delete from the old Interaction node.
The application now contains a loop application. See FIG. 47.
iv. Reactivate the User Interface node in the Interaction node.
In the Interaction node's properties dialog box, select the User Interface node and click Add.
The user interface properties have been reactivated.
4. Double-click on the Do While Loop node.
The Do While loop's properties dialog box is displayed.
5. Type a title and name for the new node.
The sample title is User Not Found, and the sample name is UserNotFound.
6. Click OK.

Figure 48:
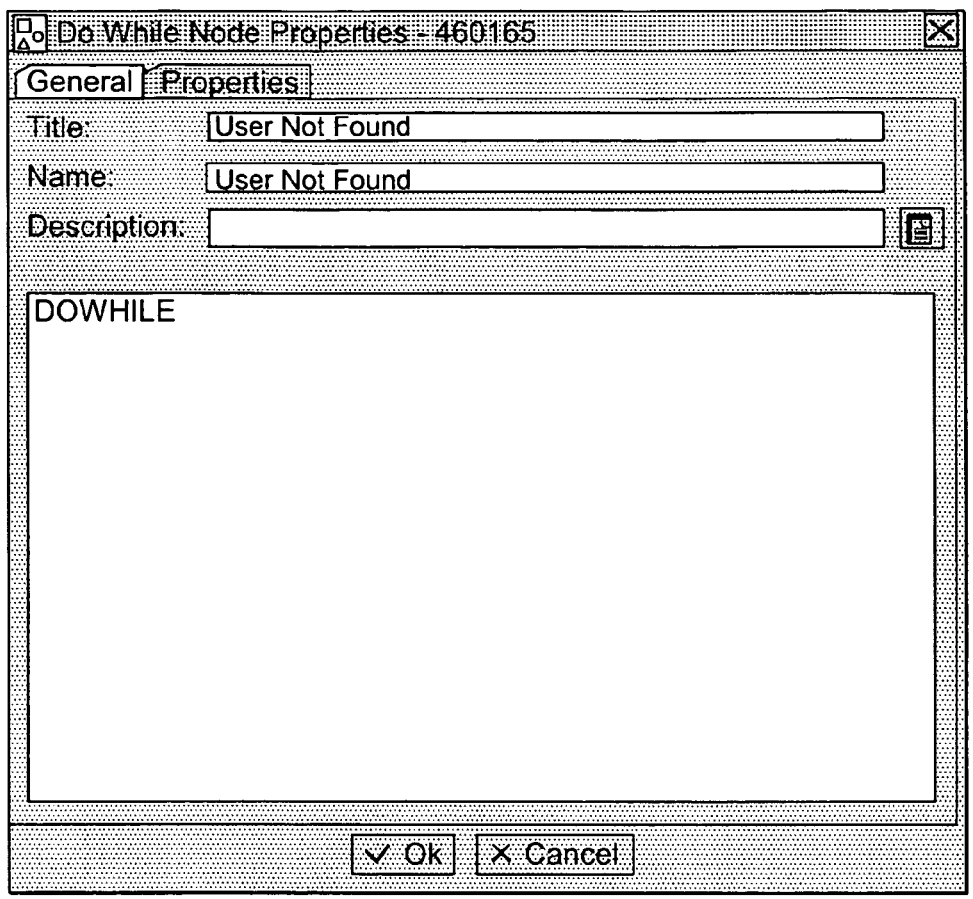
FIG. 48 is a screen shot of a do while loop node's properties.
Figure 49:
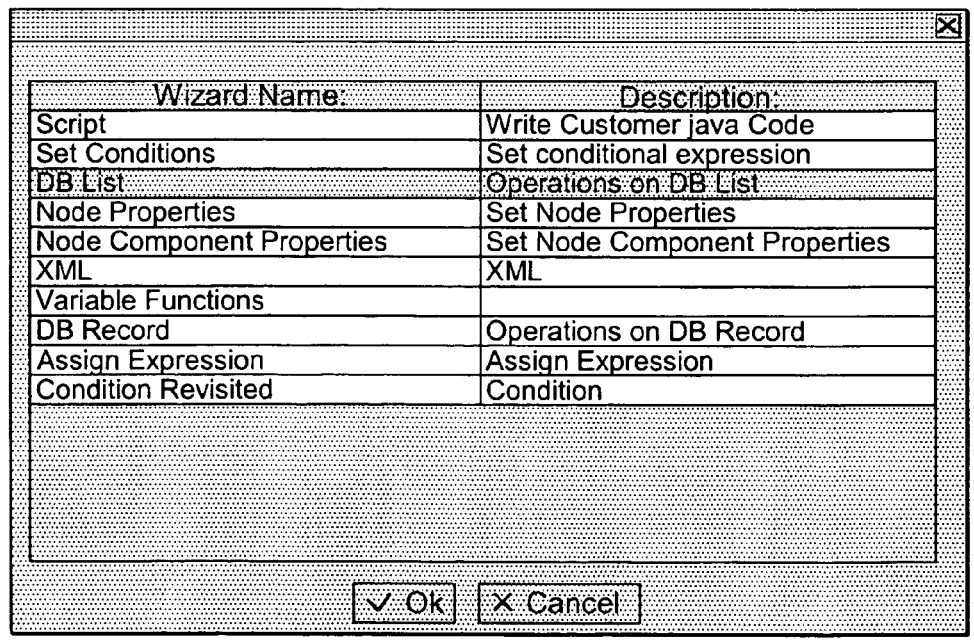
FIG. 49 is a screen shot of a list of the do while loop node's functions available.
Figure 50:
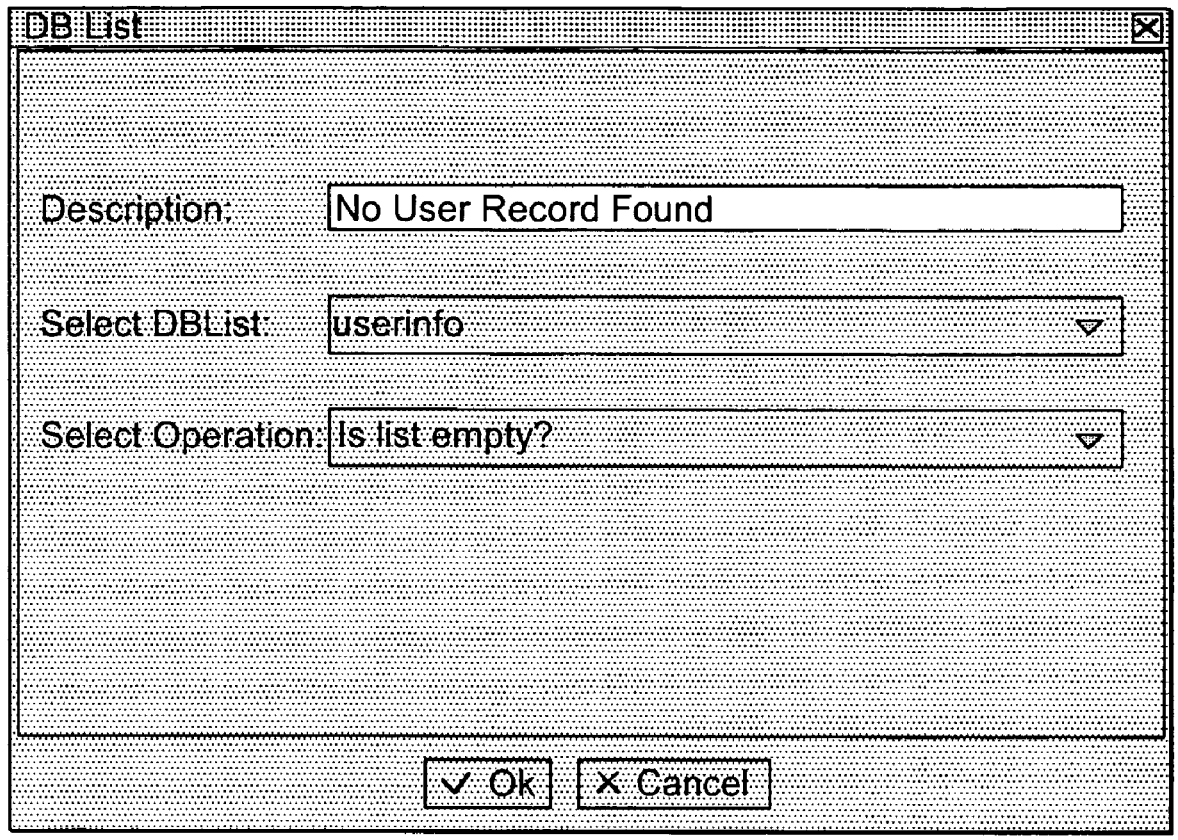
FIG. 50 is a screen shot of a DB list functions available at the do while loop node.

Step 2 Define the Do While Loop Node's Conditions.
1. Open the Do While Loop node's properties dialog/box.
Double-click on the Do While Loop node in the Application Diagram.
The Do While Loop node's properties dialog box is displayed. See FIG. 48.
2. Right-click on the DO WHILE in the large text box.
A menu will be displayed with the options New and Expand Tree. Select New.
A Wizard box with a list of options is displayed. See FIG. 49.
3. Select one of the listed options.
For the sample case, DBList is selected.
The DBList's properties dialog box will appear. See FIG. 50.
4. Enter a description.
In the Description field, type a description of the condition.
For the sample case, No Record Found is entered.
5. Select a DBList variable.
Under the drop down list in the Select DBList field is a list of variables that were created through the Task Node.
Select one of the variables.
For the sample case, userinfo is selected.
6. Select an Operation.
Under the click arrow in the Select Operation field is a list of possible operations.
Select one of the Operations.
For the sample case, Is list empty? is selected.
7. Click OK.
The conditions will appear in the Do While Loop node's properties dialog box.

Saving the Application

At a few points while building the application, the application was saved.
Once the application is completed, save it again.

Figure 51:
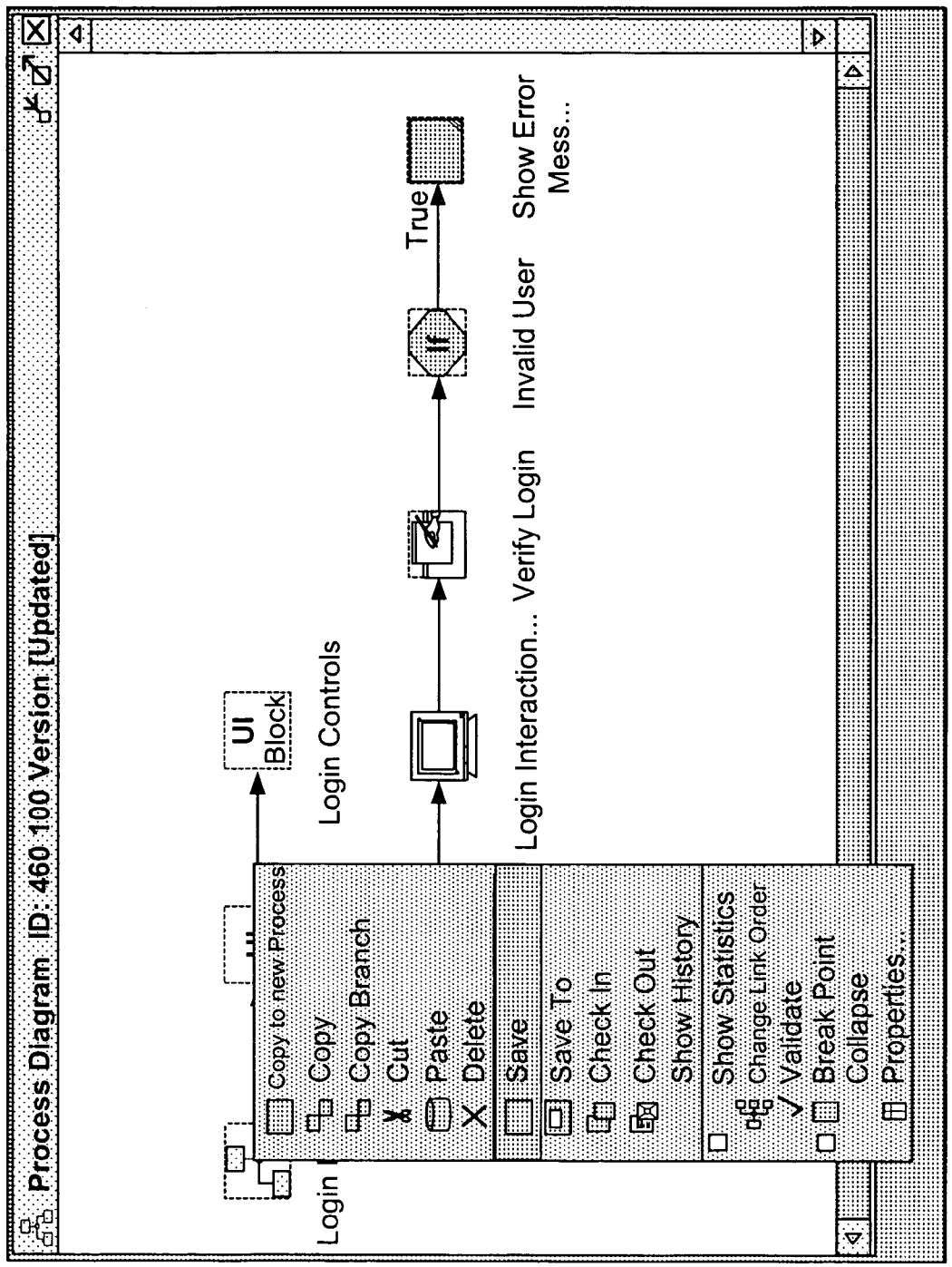
FIG. 51 is a screen shot of an application node menu.

Step 1 Save the Application.
1. Complete the application.
a. Right-click on the Application node.
For the sample case, the Application node is labeled Login application.
The Application node menu is displayed. See FIG. 51.
b. Select Save.
2. Find the Application node's ID.
Write down the ID that is displayed in the title of the Application Diagram.

Testing the Application

Once the application is completed and saved, test it to be sure it is functioning correctly.

Figure 52:
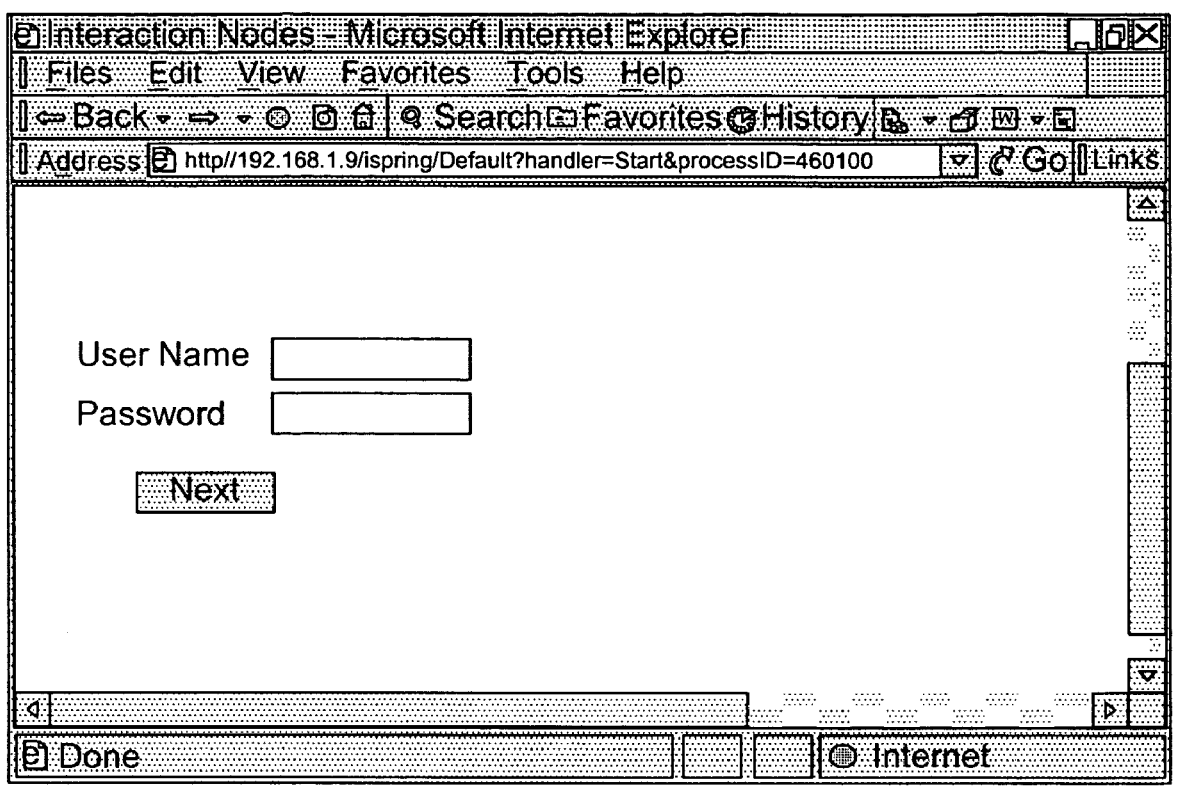
FIG. 52 is a screen shot of basic fields in the login process.

Step 1 Verify the Application Display on the Website.
1. Open a web browser.
2. Determine the Intranet path to the Smart eBusiness URL. A URL example is:
http://192.168.1.9/ispring/
Default?handler=Start&applicationID=460100
3. Specify the application ID number found in SubStep 2 b as the last six digits of the URL.
The web page for the application created is displayed.
For the sample case, the two fields User ID and Password are displayed. See FIG. 52.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope, of the invention be defined by the following claims and their equivalents.

The invention claimed is:

1. A method for creating software, comprising:
providing a plurality of nodes and a directory of applications, each of an application being created by use of at least a portion of the plurality of the nodes, wherein the at least a portion of plurality of nodes includes at least one task node interfaces with external components to exchange data information;
selecting at least a portion of the plurality of nodes to create a selected node layout that represent a plurality of application logics, wherein the selected nodes in the selected node layout have parameters and properties values can be changed dynamically based on business rules;
executing the selected node layout by a server program, wherein the application logics are directly executed without compilation, and the application logics can be paused and saved during execution, the saved application logics can be restored and execution resumed on a copy of the server program on a computer other than where is was initially started;
visually showing the selected node layout as a visual node layout;
monitoring a flow of control through each node in the node layout during execution by showing individual node execution measurement;
wherein the individual node execution measurements include usage totals, whole execution time and average execution time; and
employing a solution engine that uses networked objects to follow and manage user sessions, wherein the solution engine interfaces with an observation, personalization and pricing engine as directed by specific nodes.

2. The method of claim 1, further comprising:
visually displaying the selected node layout as a visual node layout.

3. The method of claim 1, wherein at least a portion of the plurality of application logics includes a user interaction.

4. The method of claim 3, wherein the user interaction permits a user to interact with the server program.

5. The method of claim 3, wherein the user interaction is executable on multiple channels.

6. The method of claim 3, wherein the user interaction is executable by at least one of web, voice, e-mail and wireless channels.

7. The method of claim 1, wherein the plurality of nodes includes a user interface node.

8. The method of claim 7, wherein the user interface node includes GUI components and a template for the physical layout of static and dynamic portions of a user display specific GUI components.

9. The method of claim 8, wherein dynamic portions of the user display are used by the server program at runtime to layout application.

10. The method of claim 3, wherein the user interaction includes a user interface node, a user interface block node and an interaction node.

11. The method of claim 10, wherein the user interface node and user interface block node create a user interaction based on business rules.

12. The method of claim 11, wherein the interaction node executes the user interaction.

13. The method of claim 1, wherein each node is a visual representation of a software function.

14. The interface of claim 10, wherein each node includes inputs to a software function.

15. The method of claim 1, wherein the selected node layout can be debugged visually.

16. The method claim 1, wherein the parameter and properties values can be linked to variables.

17. The method of claim 1, wherein the saved application logic can be restored and resumed.

18. A method for creating software, comprising:
providing a plurality of nodes and a directory of applications, each of an application being created by use of at least a portion of the plurality of the nodes, wherein the at least a portion of plurality of nodes includes at least one task node interfaces with external components to exchange data information;
selecting at least a portion of the plurality of nodes to create a selected node layout that represent a plurality of application logics, wherein the selected nodes in the selected node layout have parameters and properties values can be changed dynamically based on business rules;
defining the application logic by selecting at least one of GUI parameters and options in each selected node;
executing the selected node layout by a server program, wherein the application logics are directly executed without compilation, and the application logics can be paused and saved during execution, the saved application logic can be restored and execution resumed on a copy of the server program on a computer other than where is was initially started;
visually displaying the selected node layout as a visual node layout;
monitoring a flow of control through each node in the node layout during execution by displaying individual node execution measurement;
wherein the individual node execution measurements include usage counts, total execution time and average execution time; and
using a solution engine that utilizes networked object to track, control and manage user sessions, wherein the solution engine interfaces with an observation, personalization and pricing engine as directed by specific nodes.

19. The method of claim 18, further comprising: providing documentation of a functional use of a node.

20. The method of claim 18, further comprising: providing a graphic description of a plurality of nodes that represent a full application logic.

21. The method of claim 18, further comprising:
creating a history of different versions of the application logic.

22. The method of claim 18, further comprising:
creating access control of the application logic.

23. The method of claim 22, wherein the access control provides single access of the application logic for purposes of modification and multiple access of the application logic for purposes of viewing.

24. The method of claim 18, further comprising:
automatically validating the application logic against errors.

25. The method of claim 18, further comprising:
aggregation at least a portion of the plurality of nodes to create an aggregated node.

26. The method of claim 25, wherein the aggregated node is an application logic.

27. The method of claim 26, wherein the aggregated node can be used different application logics.

28. A method for creating software, comprising:
providing a plurality of nodes and a directory of applications, each of an application being created by use of at least a portion of the plurality of the nodes, wherein the at least a portion of plurality of nodes includes at least one task node interfaces with external components to exchange data information;
selecting at least a portion of the plurality of nodes to create a selected node layout that represent a plurality of application logics, wherein the selected nodes in the selected node layout have parameters and properties values can be changed dynamically based on business rules;
defining external application interfaces;
executing the selected node layout by a server program, wherein the application logics are directly executed without compilation, and the application logics can be paused and saved during execution, the saved application logic can be restored and execution resumed on a copy of the server program on a computer other than where is was initially started;
illustrating the selected node layout as a visual node layout;
observing a flow of control through each node in the node layout during execution by illustrating individual node execution measurement;
wherein the individual node execution measurements include usage tallies, entire execution time and mean execution time; and
using networked objects to track, control and manage user sessions to interface with an observation, personalization and pricing engine as directed by specific nodes.

29. The method of claim 28, further comprising:
establishing conditions for execution of the selected node layout.

30. The method of claim 29, wherein the conditions for the execution include time based events.

31. The method of claim 29, wherein the conditions for the execution include programmatic events.

32. The method of claim 31, wherein selected programmatic events create a trigger for the execution of the selected node layout.

* * * * *